(12) United States Patent
Kelly

(10) Patent No.: US 11,936,716 B2
(45) Date of Patent: Mar. 19, 2024

(54) SYSTEM AND METHOD FOR PROVIDING A SECURE NETWORK

(71) Applicant: Surfdash Inc., Las Vegas, NV (US)

(72) Inventor: Jennifer Kelly, Pacific Grove, CA (US)

(73) Assignee: Surfdash Inc., Las Vegas, NV (US)

( * ) Notice: Subject to any disclaimer, the term of this patent is extended or adjusted under 35 U.S.C. 154(b) by 364 days.

(21) Appl. No.: 17/490,575

(22) Filed: Sep. 30, 2021

(65) Prior Publication Data

US 2022/0021728 A1     Jan. 20, 2022

Related U.S. Application Data

(63) Continuation-in-part of application No. 15/846,001, filed on Dec. 18, 2017, now abandoned, which is a continuation of application No. 14/871,920, filed on Sep. 30, 2015, now Pat. No. 9,847,994.

(60) Provisional application No. 63/085,769, filed on Sep. 30, 2020.

(51) Int. Cl.
| | |
|---|---|
| *H04L 67/06* | (2022.01) |
| *G06F 21/44* | (2013.01) |
| *G06F 21/62* | (2013.01) |
| *H04L 9/40* | (2022.01) |
| *H04L 67/1097* | (2022.01) |

(52) U.S. Cl.
CPC .............. *H04L 67/06* (2013.01); *G06F 21/44* (2013.01); *G06F 21/6227* (2013.01); *H04L 63/067* (2013.01); *H04L 63/0807* (2013.01); *H04L 67/1097* (2013.01)

(58) Field of Classification Search
CPC . H04L 67/06; H04L 67/1097; H04L 63/0807; G06F 21/44; G06F 21/6227; G06F 21/33; G06F 21/6245
See application file for complete search history.

(56) References Cited

U.S. PATENT DOCUMENTS

| | | |
|---|---|---|
| 6,308,173 B1 | 10/2001 | Glasser et al. |
| 9,462,003 B2 | 10/2016 | Liu |
| 2005/0177631 A1 | 8/2005 | Bahl et al. |
| 2006/0015945 A1 | 1/2006 | Fields |
| 2007/0106650 A1 | 5/2007 | Moore |
| 2013/0018960 A1 | 1/2013 | Knysz et al. |
| 2014/0067702 A1 | 3/2014 | Rathod |
| 2016/0006743 A1 | 1/2016 | Liu |

OTHER PUBLICATIONS

A. A. Battah, M. M. Madine, H. Alzaabi, I. Yaqoob, K. Salah and R. Jayaraman, "Blockchain-Based Multi-Party Authorization for Accessing IPFS Encrypted Data," in IEEE Access, vol. 8, pp. 196813-196825, 2020, doi: 10.1109/ACCESS.2020.3034260. (Year: 2020).*

(Continued)

*Primary Examiner* — Brian F Shaw
(74) *Attorney, Agent, or Firm* — Honigman LLP

(57) ABSTRACT

A method and system for providing a secure network includes a dApp that can act as a compiler that relies on independent authentication via another node, dApp, or wallet. The dApp, additionally or alternatively, is an independent resource ledger and/or serves only to render, secure, or transfer content, distributed via other external databases or ledgers, and accessed via a token exchange.

20 Claims, 26 Drawing Sheets

(56) References Cited

OTHER PUBLICATIONS

S. Ohashi, H. Watanabe, T. Ishida, S. Fujimura, A. Nakadaira and J. Kishigami, "Token-Based Sharing Control for IPFS," 2019 IEEE International Conference on Blockchain (Blockchain), Atlanta, GA, USA, 2019, pp. 361-367, doi: 10.1109/Blockchain.2019.00056. (Year: 2019).*

* cited by examiner

| EMAILING CONTROLS | Board Owner | Collaborators | Ecosystem Users | Public |
|---|---|---|---|---|
| EMAILING CONTENT | | | | |
| Email Web Content (not uploaded) | Y | Y | Y | X |
| Email Uploaded Content | Y | X | X | X |
| | | | | |
| EMAILING BOARDS | | | | |
| Email Private Board | X | n/a | n/a | n/a |
| Email Collaborative Board | X | X | n/a | n/a |
| Email Ecosystem Board | X | n/a | X | n/a |
| Email Public Board | Y | n/a | Y | Y |
| | | | | |
| SOCIAL SHARING OF CONTENT | | | | |
| Share Web Content (not uploaded) on Social Media Sites | Y | Y | Y | X |
| Share Uploaded Content on Social Media Sites | X | X | X | X |
| | | | | |
| SOCIAL SHARING OF BOARDS | | | | |
| Share Private Board on Social Media Sites | X | n/a | n/a | n/a |
| Share Collaborative Board on Social Media Sites | X | X | n/a | n/a |
| Share Ecosystem Board on Social Media Sites | X | n/a | X | n/a |
| Share Public Board on Social Media Sites | Y | n/a | Y | Y |
| | | | | |
| KEY | | | | |
| Y=Yes, if (board/content) permissions allow | | | | |
| n/a = not applicable, due to permission settings | | | | |

Figure 13

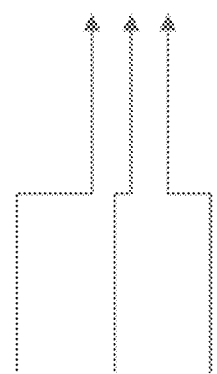
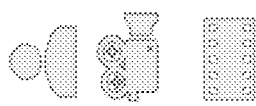
FIGURE 17

SYSTEM AND METHOD FOR PROVIDING A SECURE NETWORK

CROSS REFERENCE TO RELATED APPLICATIONS

This U.S. patent application claims priority to U.S. Provisional Patent Application No. 63/085,769, filed Sep. 30, 2020, and is a continuation-in-part, and claims priority under 35 U.S.C. § 120 from, U.S. patent application Ser. No. 14/871,920, filed on Sep. 30, 2015. These disclosures of these prior applications are considered part of the disclosure of this application and are hereby incorporated by reference in their entireties.

TECHNICAL FIELD

The present invention relates to methods and systems to provide secure database and network environments having private and public aspects.

BACKGROUND

As digital mobility and geodiversity of workforces increase, content once stored locally is often migrated to digital clouds. A common assumption is that cloud storage is better and cheaper—and by utilizing cloud applications, stakeholder interaction can be more centralized, and therefore convenient. However, many problems exist with cloud applications and storage, and conventional wisdom often glosses over security flaws inherent in each.

SUMMARY

The present invention is generally directed to a secure network ecosystems and methods.

An aspect of the secure network ecosystem can include a URL programming interface, a server, and a database. The server can be configured to receive a request from the URL programming interface. The server can include a file manager, an authentication server, a resource server, and a collaboration server.

In some embodiments, the authentication server can ensures that requests are valid.

In other embodiments, the secure network ecosystem can further include an application program interface (API). The API can be configured to authenticate tokens, which can be generated by the authentication server. Requests can be HTTP communications and/or FTP communications.

Another aspect of a secure network ecosystem can further include a second secure network ecosystem. The second secure network ecosystem can include a second URL programming interface, a second server, and a second database. The second database can be connected to the second server. The second secure network ecosystem can be configured to send and/or receive requests from and/or to the secure network ecosystem. The second secure network ecosystem can be configured to send and/or receive authentication requests from and/or to the secure network ecosystem.

In yet other embodiments, the second server can determine whether requests are authorized based on, for example, a token, which can be generated by the authentication server. The token can have a limited lifetime, for example, less than twenty minutes, less than five minutes, less than two minutes.

In some embodiments, the resource server can include a token validator, a query engine, and a metadata manager. The resource server can include a central repository of metadata. The metadata can be publicly available. The metadata can be associated with content. The content can be publicly unavailable. Filenames associated with the content can be publicly invisible. In some embodiments, the metadata is publicly searchable.

In other embodiments, data on the database can be stored according to the first normal form (1NF), according to the second normal form (2NF), and/or according to the third normal form (3NF). Alternatively, the data can be stored in violation of one or more of the first, second, and third normal forms. The database can be a normalized database, a non-normalized database, or a partially non-normalized database.

In yet other embodiments, the database can contain content and/or filenames associated with the content. The content and/or the filenames can be encrypted. File extensions associated with the content can be encrypted. The database can further contain public content that is stored as plaintext. Data on the database have locations. The locations can be obfuscated. The locations can be stored outside of the database. The locations can be hashed.

Other aspects, embodiments, and features will be apparent from the following description, the drawings and the claims.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 13 illustrates an exemplary window of permissions for different user levels.

FIG. 17 illustrates an exemplary dataflow for news media authentication.

DETAILED DESCRIPTION

Figure 1:
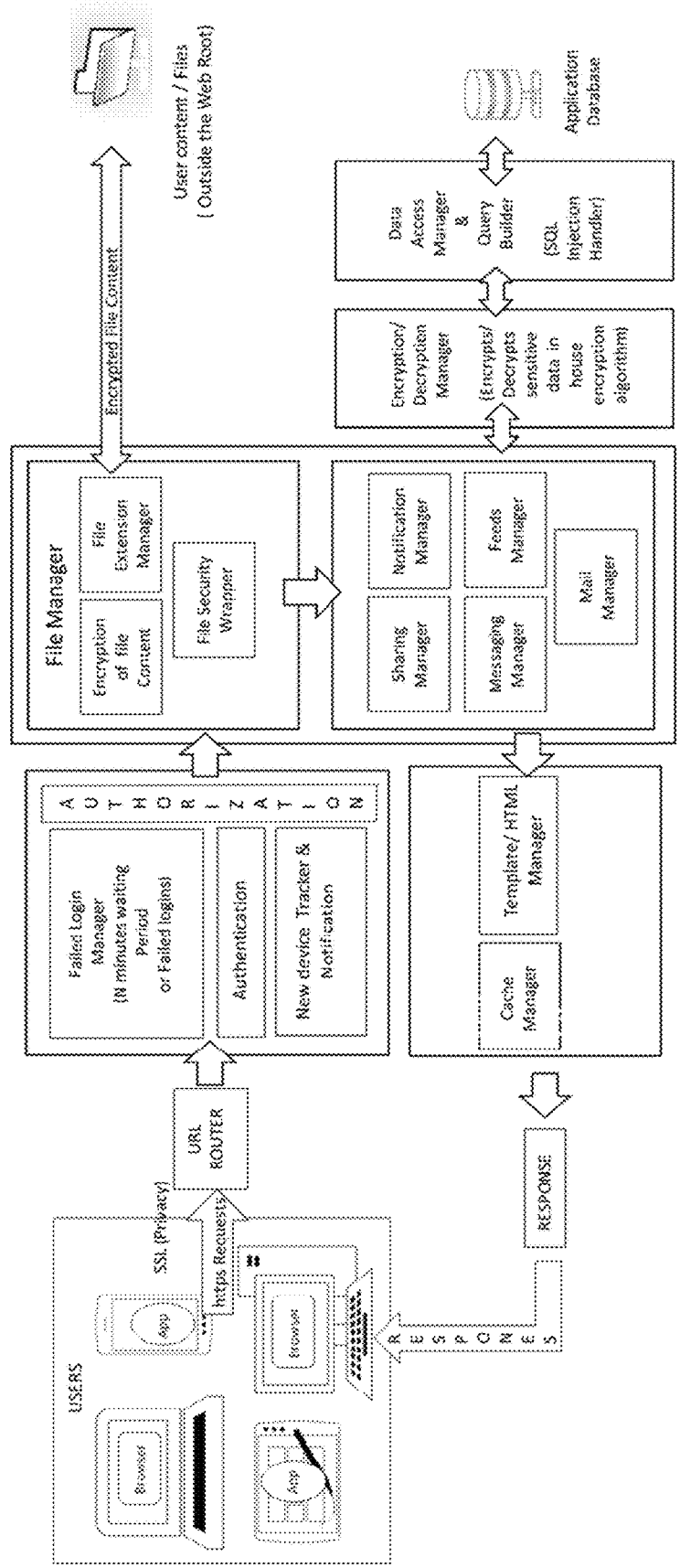
FIG. 1 illustrates an architectural overview of an embodiment.

A detailed explanation of the system and method according to exemplary embodiments of the present invention are described below. Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention.

The present invention is generally directed to digital ecosystems, devices and methods for establishing and/or maintaining secure networks that can have private and public aspects. The various techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere in this document. Various computer-based systems, methods and implementations in accordance with the described technology are presented below.

A secure network can be embodied by general- or special-purpose computers and/or servers and can have an internal or external memory for storing data and programs such as an operating system and one or more application programs. Examples of application programs include computer programs implementing the techniques described herein, authoring applications capable of generating documents or other electronic content; client applications (e.g., an Internet Service Provider (ISP) client, an e-mail client, and/or an instant messaging (IM) client) capable of communicating with other computer users, accessing various computer resources, and viewing, creating, or otherwise manipulating electronic content; and browser applications capable of rendering Internet content and other content formatted according to standards or protocols such as the Hypertext Transfer Protocol (HTTP). One or more of the application programs can be installed on the internal or external storage of the general-purpose computer. Alternatively, application programs can be externally stored in or performed by one or more device(s) external to the general-purpose computer.

The computers and/or servers can include a central processing unit (CPU) for executing instructions in response to commands, and a communication device for sending and receiving data. One example of the communication device can be a modem. Other examples include a transceiver, a communication card, a satellite dish, an antenna, a network adapter, or some other mechanism capable of transmitting and receiving data over a communications link through a wired or wireless data pathway. The systems can also include input/output interfaces that enable wired and/or wireless connection to various peripheral devices. In one implementation, a processor-based system can include main memory and can also include secondary memory, which can be a tangible computer-readable medium. The tangible computer-readable medium memory can include, for example, a hard disk drive or a removable storage drive, a flash based storage system or solid-state drive, a floppy disk drive, a magnetic tape drive, an optical disk drive (e.g. Blu-Ray, DVD, CD drive), magnetic tape, paper tape, punched cards, standalone RAM disks, Iomega Zip drive, etc. The removable storage drive can read from and/or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In some embodiments, the tangible computer-readable medium memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or flash memory) and associated socket, and other removable storage units and interfaces, which allow software and data to be transferred from the removable storage unit to the computer system.

Aspects can include a network with a knowledgebase and a content management system (CMS). The CMS and publishing platforms can be utilized to facilitate, e.g., social media, knowledgebase collaboration, curation, public relations, recruitment, sponsorship, and/or marketing. The network can be hosted by one or more servers, such as a Web server and/or server farm and can provide private and/or public access such as portals and webpages. The server can include file servers and/or database servers, which can be dedicated and/or multiprocessing-type operating systems. The server can include mail servers to move and/or store mail over corporate networks (e.g. via LANs and/or WANs) and/or across the Internet; web servers to load and serve data across the Internet (e.g. via browsers using HTTP); server platforms that can include underlying hardware and/or software to drive the system; application servers that can provide middleware between database servers and end users; real-time communication servers, chat servers, IRC servers, and/or instant messaging (IM) servers that can facilitate the nearly instantaneously exchange of information; File Transfer Protocol (FTP) servers that can facilitate transfer control and/or the secure transfer of files; collaboration servers; list servers; telnet servers; open source servers; and/or virtual servers. Server, as used herein, can refer to programs that manage resources and/or to physical computer systems. For example, in an embodiment, the server can include a 64-bit, four-core, 2.0 GHz per core (or faster) processor. The server can further include 4 GB of RAM for staging and/or 8 GB of RAM for production. The server can include a 500 GB drive for staging and a 1 TB drive for production; but, it would be appreciated by a person having ordinary skill in the art that disk space requirements, as with other computer requirements, can vary widely based on user needs and preferences. In an embodiment, the server can include an operating system such as the 64-bit CentOS; a secure database can comprise an open-source relational database management system such as MySQL 5.6; and the web server can be implemented with Apache and utilize PHP. In some embodiments, open ports can include 80, 443, and 8081 (for real-time messaging).

Tables I and II describe exemplary hardware and software configurations that can be utilized for certain embodiments. The tables are intended to provide context to a person having ordinary skill in the art and are not intended to limit any particular embodiment or invention. A person having ordinary skill in the art would appreciate that the exemplary values can be adjusted to meet the needs and preferences associated with implementation. For example, hard disk space can be dependent upon the quantity and type of content being curated as well as upon the level of participation expected and/or allow for each type of user. Further, the software utilized can be chosen for a particular design preference, project needs, and/or hardware requirements.

TABLE I

Exemplary Server Hardware

| Processor | RAM | Hard Disk Space | Platform Size |
|---|---|---|---|
| 64-bit, 2 cores | 8 GB | 1 GB to 2 TB per user | Small deployment (e.g. 100− users) |
| 64-bit, 4 cores | 16 GB | 1 GB to 2 TB per user | Medium deployment (e.g. 100-200 users) |
| 64-bit, 8 cores | 32 GB | 1 GB to 2 TB per user | Large deployment (e.g. 200+ users) |

TABLE II

Exemplary Server Software

| Description | Value | Version |
|---|---|---|
| Operating System | 64-bit | Linux, e.g. CentOS, Red Hat, Ubuntu |
| Web Server | Apache | Version 2.4x and above |
| Database | MySQL | Community Edition 5.x and above |
| | PHP | Version 5.6x and above |

FIG. 1 illustrates the architecture of an embodiment. Users can send HTTPS requests via SSL connections from their devices (e.g. laptops, desktops, and/or mobile devices). The requests can be routed for processing through an authentication module, where credentials can be compared to those on file, e.g. in a secure database of authorized user information which can be on a local operating system or within an authentication server. Credentials to be authenticated can include the specific device from which an HTTPS request originated, and if the specific device is not registered or known, a notification can be sent to the user of attempted accessing by an unknown device. If the credentials match, the user can be granted authorization for access to a file manager. The file manager can include a module for encrypting file content, a file extension manager, and/or a file security wrapper module. The file manager can control user content and files, and can further include managers for file sharing, notifications, messaging, feeds, and/or mail. The file manager can also be in communication with an application database via, e.g., an encryption/decryption manager, a data access manager, and a query builder such as an SQL query builder. The encryption/decryption manager can encrypt and/or decrypt data, such as sensitive data, and can utilize a purpose-built encryption algorithm and/or a known or publicly available encryption algorithm. The file manager can further send responses (to a user's initial URL request) via a cache manager and/or template/HTML manager.

Different encryptions can be utilized in various embodiments. As an example, a content access key can be encrypted using, e.g., AES-256 encryption with a 32-bit key via the mcrypt PHP extension. IDs, which can be passed through URLs, can be encrypted using, e.g., normal encode hashing mechanisms with different keys for each module. Each module can be configured with different key. File content can be encrypted using, e.g., AES-256 encryption with a 32-bit random key via the mcrypt PHP extension. This can be a user-controlled functionality, and can be performed, e.g., if user selects to encrypt while uploading a content. User passwords can also be hashed using a strong one-way hashing algorithm (e.g. bcrypt) before storing in database to enhance security.

Database—Hosting and Security

Companies face the increasingly daunting task of communicating vast quantities of knowledge created and shared between employees, stakeholders, customers, decision makers and others. Often multi-institutional, this information can run the gamut from private files to inter-organizational collaboration, to public outreach. While smaller companies might garner savings with public cloud storage due to their limited needs (i.e., small websites/data stores, low IP concerns, and mostly internal or ad hoc projects), many institutions, especially large ones, typically benefit more from private cloud hybrids. Security protocols and data organization should be serious concerns, and may require organization-level physical security and/or regulatory requirements to develop and implement best practices.

Embodiments can meet such challenges, offering multiple deployment options to meet an organization's cloud strategy needs. For example, a private cloud can be hosted as a standalone, secure cloud database. A private cloud can be hosted through a third-party or on an internal, organization server via cloud applications for existing databases and/or servers. Embodiments can be implemented through a hybrid cloud, e.g. on multiple servers with a bridge between private and hosted servers, or through a hybrid cloud and a public cloud. This flexibility can allow organizations of different sizes and needs to tailor their cloud strategy and ramp-up, while coherently addressing security concerns and effectively managing resources. With flexible designs, multiple implementation models, and secure, cloud-based, cross-server functionality, embodiments can adapt to evolving enterprise and business needs.

The platform can transform data, e.g. through encryption and/or obfuscation, to significantly increase security. Primarily for security reasons, embodiments can transform and/or obfuscate information at multiple levels. This can create a labyrinth to thwart a would-be hacker seeking to get information from the system. Additionally, data location can be obfuscated such that the database lacks sufficient information to help someone determine the location of files for that user within the server. Preventing the making of connections between a user and their files on a server can make unauthorized data retrieval practically impossible.

To provide further security, the location of data stored outside of the database can also be hashed to make it challenging to determine which folders inside the platform correlate to which users. This can be important because if it is known where files are stored for a particular user, it can be possible to retrieve their uploaded documents and other files, for example, through the use of brute force of opening and reading each file.

Additional layers of security can be implemented such as file name and content obfuscation and URL link obfuscation. If an unauthorized user were able to determine the location of certain files on a server, the platform can provide further obstacles to data breach by hashing the name of each individual folder and file, including the file extension. This can render the task of determining file content impracticably laborious. URLs that are shown to the users can be virtual URLs such that the actual link is not shown. Rather, fake URLs can be shown, and the actual URLs can be determined in real-time (i.e. on-the-fly) by the application. This can occur at the board level and/or the file level. URL obfuscation and/or encryption can eliminate the ability to share URLs with other users (a security risk and problem with previous systems that is often implemented with email and text authorization). These additional layers provide further shields of the actual location of the content from the user that can prevent unauthorized users from accessing the data.

File Management & Storage—Centralized Knowledgebase

Organizations often struggle to utilize clouds and cloud technology as means for centralizing information for stakeholders (employees, customers, contractors, investors, etc.). Two types of SaaS models have been used for organization of a knowledgebase, specifically communication apps (for leveraging project data) and cloud apps (based on legacy file-storage architecture). Truly effective knowledgebase design, however, can leverage a centralized, secure database with decentralized administration for greater stakeholder participation. Embodiments herein can achieve such goals by utilizing several features. For example, users can collect, collaborate, and annotate files within thematic folders, creating contextualized resources. Content can have ownership, and file permissions can be set to private, shared with groups, or published to the public. Content and files can be accessible via a central cloud UX. The platform, or app, can be file-type and file-size agnostic. These features can be considered important but should also be balanced as user/business preferences dictate to account for security and/or increased IT/administrative workload.

File management and storage can further utilize aggregating/communications models and file storage models. For SaaS providers employing architectures such as Jive, Yammer, and Slack, content that is accessible within the app is not necessarily centralized. Instead, the app can rely on simple API calls to serve content from multiple systems. Although searchable, such apps only address communication and result in systems or methods that have a social layer offering only short term productivity (e.g. comments on files); search-only contextualization can limit the impact of human intent and an organization's ability to leverage data; and security dependencies can be multiplied as other applications are accessed for basic functionality. Additionally, aggregation-style apps are typically organized within social streams or project files. Both models can be ineffective for large scale document sharing and can become silos within themselves—e.g., losing a post in a Facebook stream or searching through group emails for relevant files. File storage models (e.g. file sync and share, or FSS) have been utilized in other cloud apps, such as Box and Dropbox. The user experience (UX) merely mimics legacy systems—files are uploaded, folders are nested, and permissions (in enterprise versions) are based upon pre-set roles within the organization. In such familiar, legacy file-storage architecture, files are typically assigned a role-level, and all files beneath that level can be viewed. This hierarchal remnant of machine-thinking can hamper security efforts and can be a hindrance in a high-sharing environment. Moreover, IP security can be violated when role-based access permissions automatically extend to multiple folders that cannot be severed. Role-based (rather than content-based) permissions can be a major contributing factor to large-scale data theft. Likewise, file storage apps (and most aggregator-type apps) often force users to go outside their system to share files when permission management is untenable. An important aspect in creating a convenient and effective knowledgebase can be the utilization of a blended model, i.e. combining secure database integration, content ownership, and control of user information.

Accordingly, embodiments can be implemented with a blended hosting model without the limitations and security risk associated with other systems. When hosted by a third-party, the application can function as a file storage model. When used as a bridge between servers or organizations—or, as part of a cloud ramp-up strategy—the application can mimic the aggregation model. Embodiments can be uniquely qualified as a knowledgebase, designed and developed as a social, decentralized resource library and collaboration platform with secure IP transfer. Familiar social media interface styles and/or features can incorporate user-profiles and comments, following people, organizations and departments, and subscribing to resources and projects. The knowledgebase can be user-populated; stakeholders can upload content (if permitted), edit and create boards, and update metadata and annotations.

Some embodiments include a decentralized system having features such as: admins/sub-admins, who can set user permissions (share, collaborate, or publish) and can automate administrative review procedures; administration of groups can be assigned to users within the organization or external collaborators for virtual ecosystems and multi-stakeholder collaboration; users can manage their own content, from uploading and organizing to annotation and publishing within their security parameters; organizations can leverage in-house and partner resources, review workflow and business decisions and efficiently participate in cross-organizational projects.

Embodiments can utilize a secure database that has normalized and non-normalized aspects. The data normalization can involve three basic levels: First Normal Form (1NF); Second Normal Form (2NF); and Third Normal Form (3NF). Database normalization can include 1NF normalization such as the elimination of duplicate columns, separation tables, and the use of primary keys. The platform generally meets the 2NF database normalization requirements, i.e. the use of foreign keys to remove redundant data and storage in separate tables. But, the platform can advantageously violate this protocol. For example, instead of having one record for each curated URL—that each subsequent user shares—each user that curates a URL can have their own record, even if such a record has been previously added. This can allow the content to be manipulated on the page (unlike, e.g. Pinterest) as well as the permission scheme to function. The platform can be implemented with 3NF normalization, such as the removal of columns that are not dependent upon primary keys. For example, subscribers and likes can be stored in the table for UX and analytic. This normalization, however, can advantageously be violated with regularity to improve performance.

Embodiments can include a CMS for document and/or media management and additional applications for project management and/or multi-enterprise collaboration. The CMS can include a centralized repository, a user-curated knowledge base, and a secure external drive alternative.

Any user with authorization can upload files or collect web content to the centralized repository. Centrally locating resources can reduce transfer costs and avoid administrative bottlenecks. Users create and organize curations of contextualized data and can add/edit metadata, which can ensure accuracy for local and/or public searching. Administrators can control user-permissions and can allow users to control their own content-permissions for decentralized tasks, such as collaboration, content/database building, small team review processes, IP transfers, etc.

User-Curated Knowledge Base

Profiles can be searchable. Users can be connected to content they create, identifying project ownership, organizational leadership, and/or the industry focus of the users. Users can connect via social business tools to thought-leaders, internal/external collaborators, and potential stakeholders. The platform can also allow subscribing to user content, which in turn can support business collaboration, industry sponsorships, strategic alliances, cross-discipline research, and media-rich learning. Moreover, the platform can be implemented with a familiar and/or intuitive interface, such as a social interface, that can facilitate participation, contextualization of complex ideas, and reduce administrative workload.

Secure External Drive Alternative

To enhance security, embodiments can be installed on an organization's servers and/or in a privately hosted cloud, negating security concerns over IP transfer through external vendors. Granular, content-level access permissions can be attached to files, rather than individuals, thereby limiting user access to specific content, not levels within a database. In some embodiments, content cannot be accessed independently (e.g. by link), and private files can remain within an organization's knowledgebase by limiting viewing/downloading by user session information and/or associated permissions.

Figure 2:
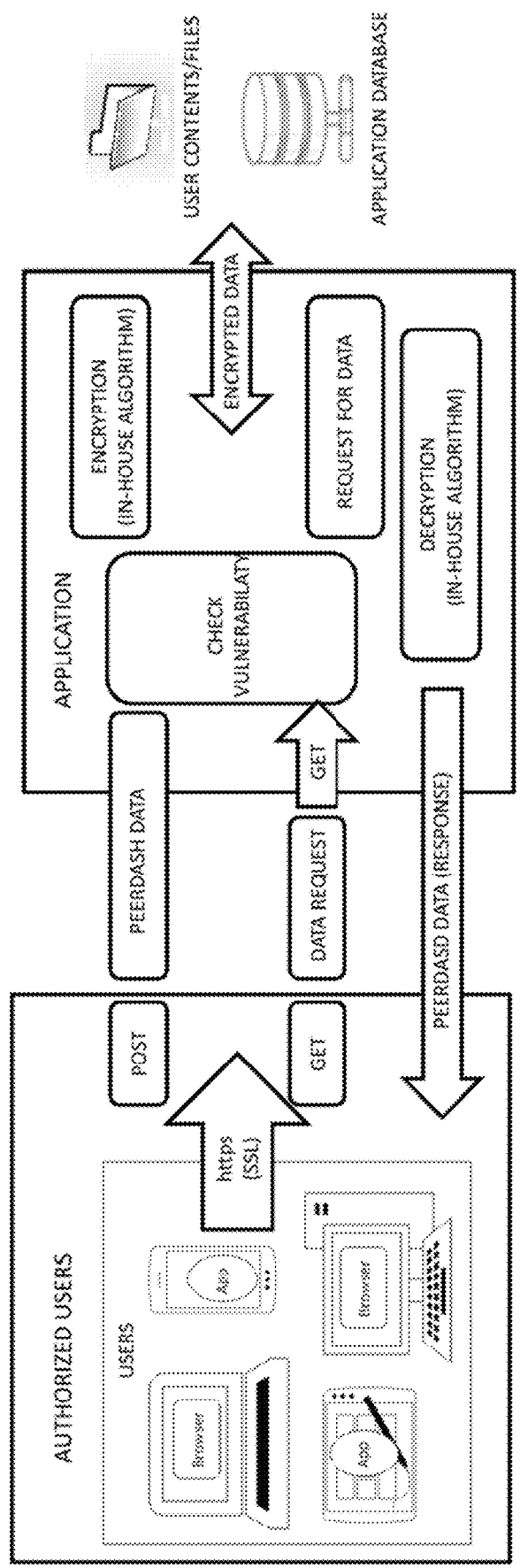
FIG. 2 is a diagram of dataflow in an exemplary embodiment.
Figure 3:
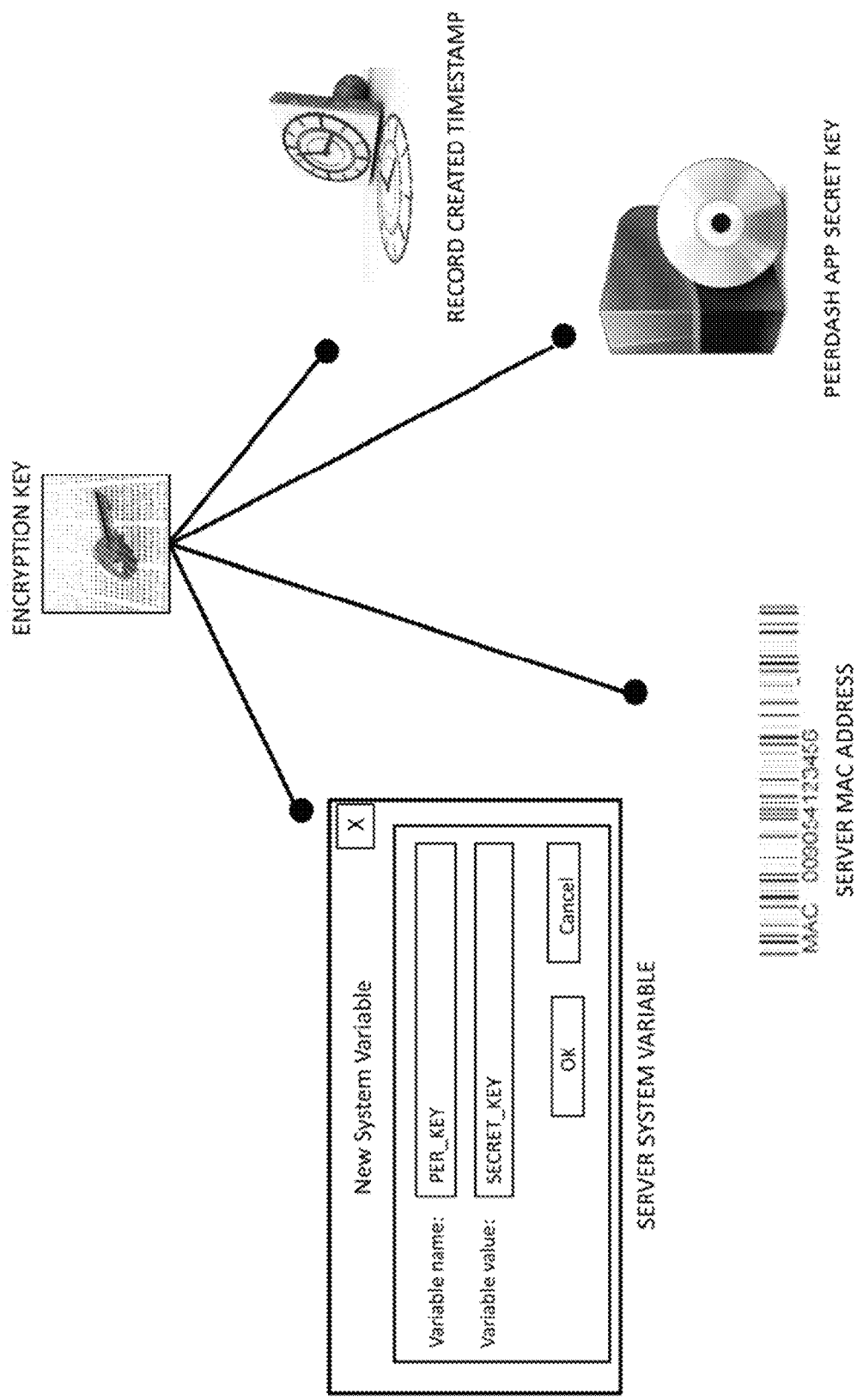
FIG. 3 illustrates encryption and decryption for an exemplary embodiment.

Additional applications can include secure IP and file transfer, social business tools, centralized, real-time communications, social media tools, branded platforms, marketing, and PR asset management. FIG. 2 illustrates a diagram of dataflow in an exemplary embodiment. Authorized users access the platform from their individual devices. Platform apps can perform authentication and encryption/decryption, as well as access an application database and user content/files. Encryption and decryption, depicted in FIG. 3, can include a secure encryption key that utilizes a plurality of information, such as server system variables, server MAC addresses, secret keys, and/or timestamps.

Peerdash Activation Server

Embodiments can include a Peerdash activation server (PAS), a group of technologies that can ensure security for content sharing, collaboration and communication within the ecosystem. PAS can facilitate the sharing of information with users of separate ecosystems, without the need to grant direct access to the server hosting the ecosystem. All ecosystem-to-ecosystem access requests can be managed by PAS, thus allowing users from different ecosystems to cooperate as if they belonged to one unified system. The core technologies can include one or more of a PAS authentication server, a PAS resource server, and a PAS collaboration server.

The PAS authentication server can ensure that requests are valid. Requests can take many forms, including performing a search, uploading metadata, collaborating, etc. Before a request can be fulfilled, a token can be granted from the PAS authentication server. The token can have a limited life to combat hacking and/or spoofing. While the lifetime of a token's validity can be, e.g., two minutes, fifteen minutes, or as long as desired, the lifetime in a preferred embodiment can be limited to a few minutes or less to enhance security. The token can also be passed to external ecosystems, if such a request is made, and that token can also be validated through the PAS authentication server prior to passing back any data. The PAS authentication server can be responsible for validating any or all requests within the ecosystem.

A PAS resource server can be a central repository of public metadata across the ecosystem. Public information from each ecosystem (e.g. profiles, boards, content, etc.) can be uploaded periodically to the PAS resource server for indexing and/or ranking. This data can be used to return relevant search results to users performing searches inside or outside their ecosystems. The PAS resource server can include a token validator, a query engine, a metadata manager, and/or an indexing/ranking engine.

Figure 4:
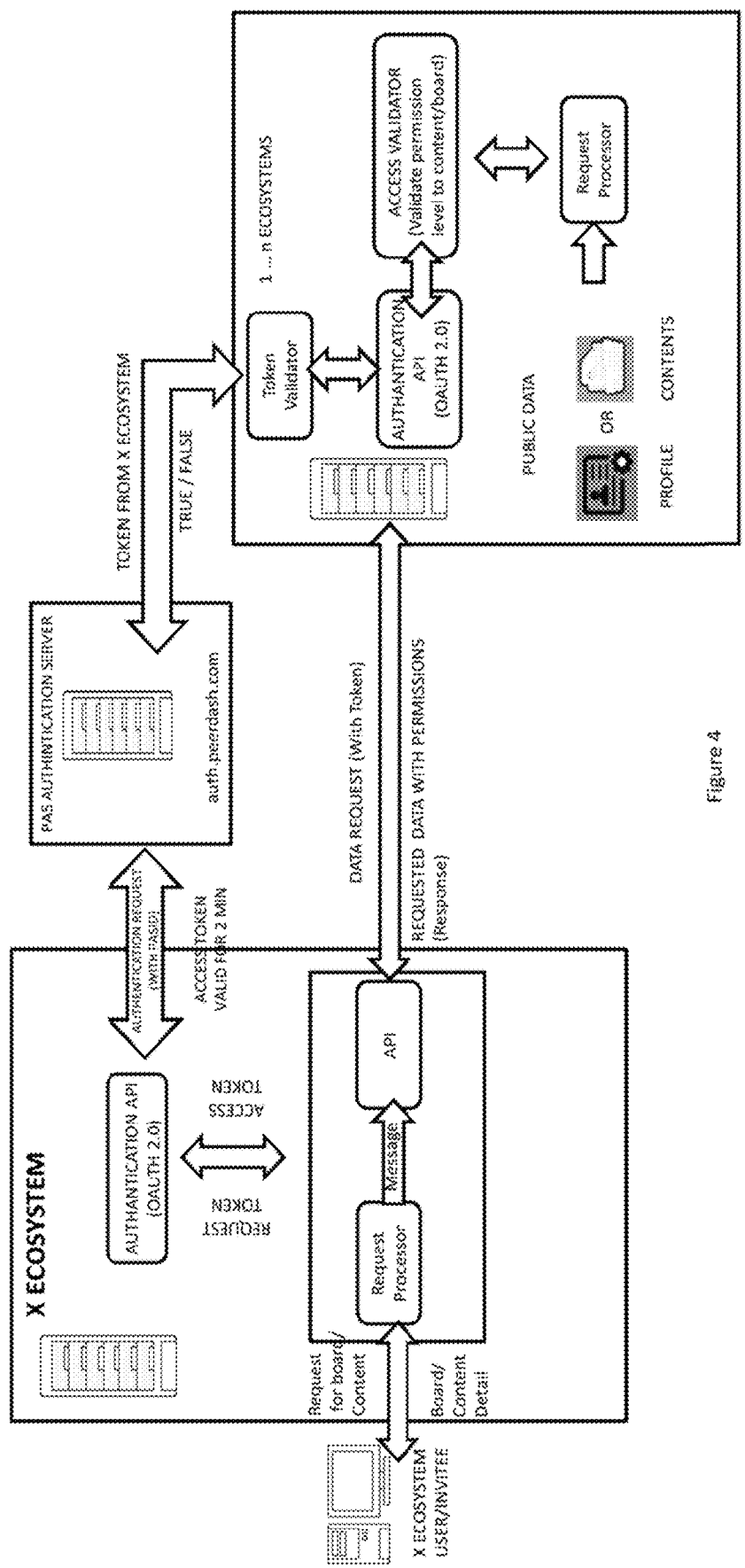
FIG. 4 depicts an exemplary embodiment including a PAS.

FIG. 4 depicts an exemplary embodiment including a PAS. As is shown in the figure, the X ecosystem includes a non-standard usage of OAuth (2.0) authentication API that does not include private user information, and instead can reference the PeerID generated on the local level. When an X ecosystem user or invitee requests access to a board and/or content, the request processor can communicate via the authentication API with the PAS authentication server, which in turn can, if appropriate, generate a token. The request can then be forwarded to the N ecosystem, and separately the N ecosystem can communicate with the PAS authentication server for token validation purposes. If authorized, the N ecosystem can process the request and return an appropriate message and/or content to the user via the X ecosystem platform. To the X ecosystem user, the entire process is seamless.

Figure 5A:
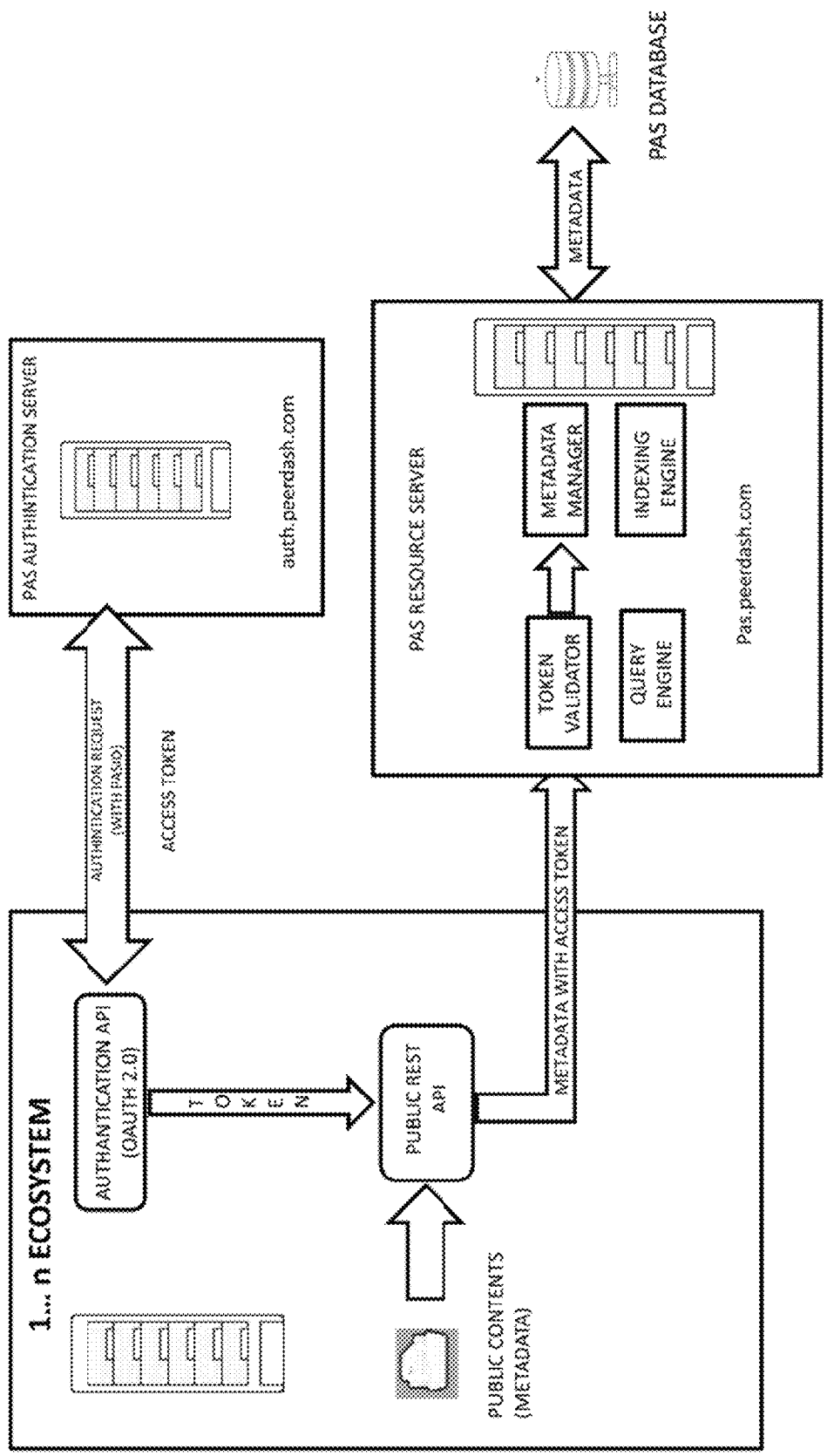
FIG. 5a illustrates an exemplary dataflow.
Figure 5B:
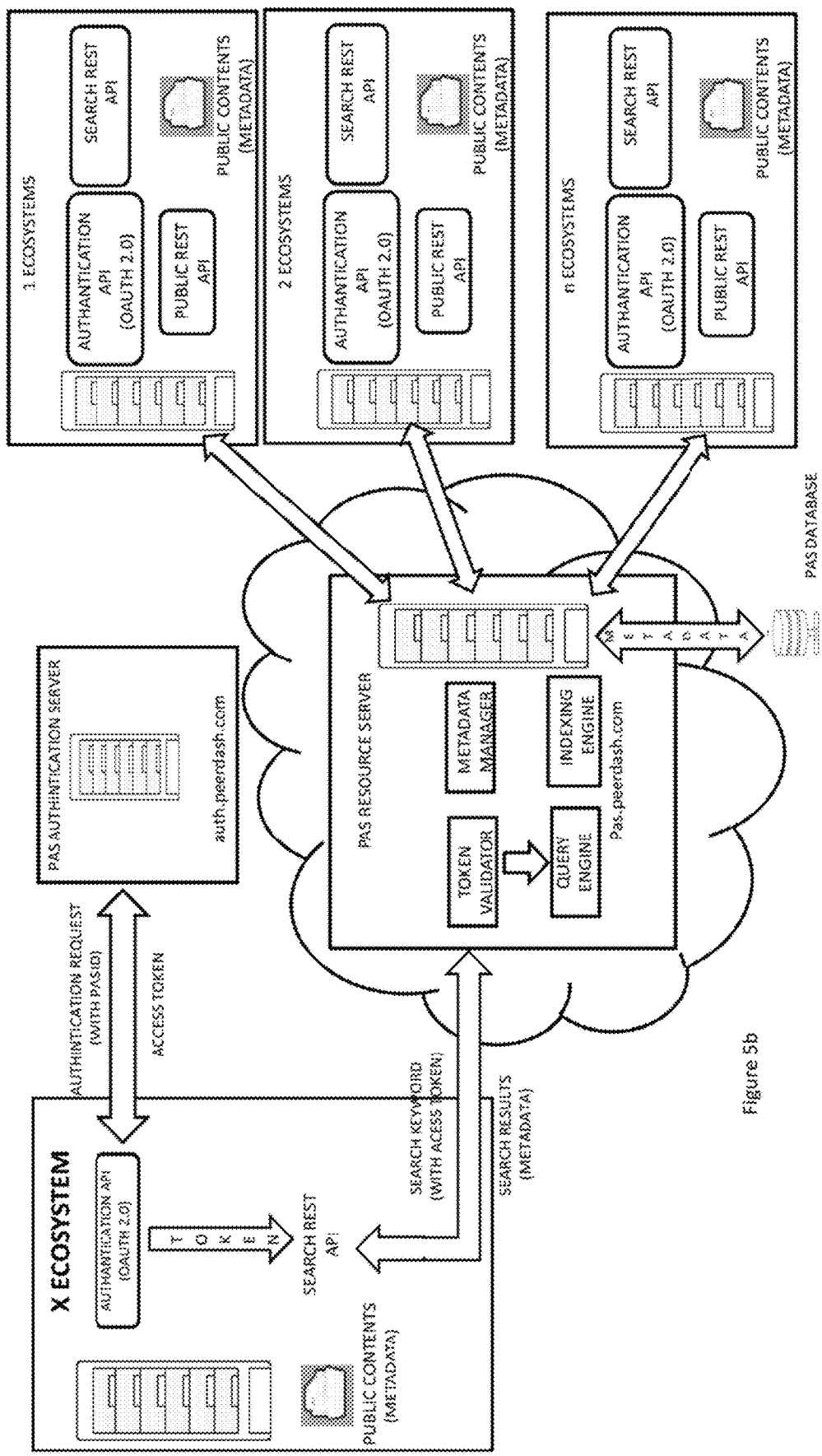
FIG. 5b illustrates an exemplary dataflow.
Figure 5C:
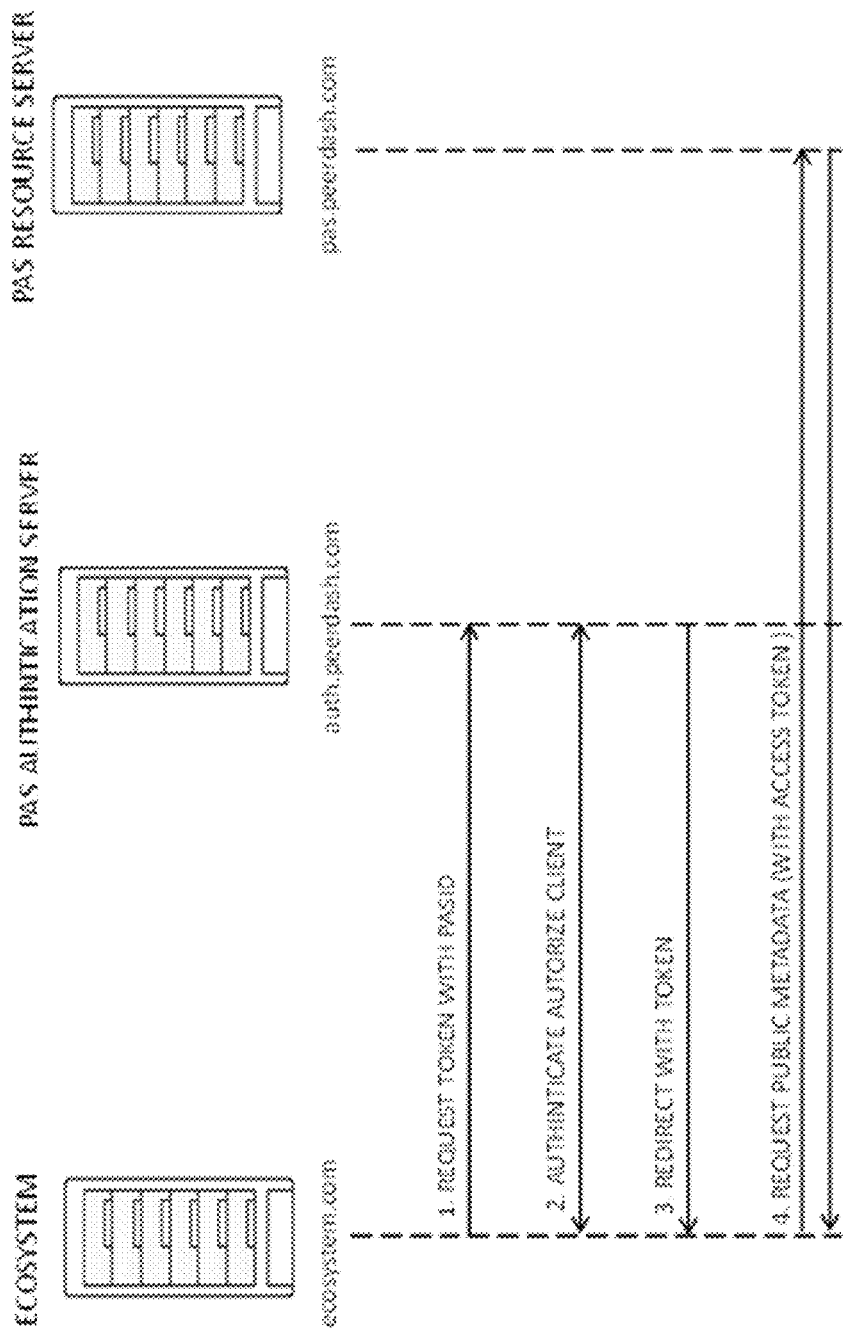
FIG. 5c illustrates an exemplary workflow.

FIG. 5a illustrates and describes the exemplary flow of data when sending metadata associated with stored public content to the PAS. FIG. 5b illustrates and describes the exemplary flow of data when searching public content hosted by a plurality of ecosystems. FIG. 5c illustrates and describes workflow, with OAuth (2.0), when searching public content.

Figure 6:
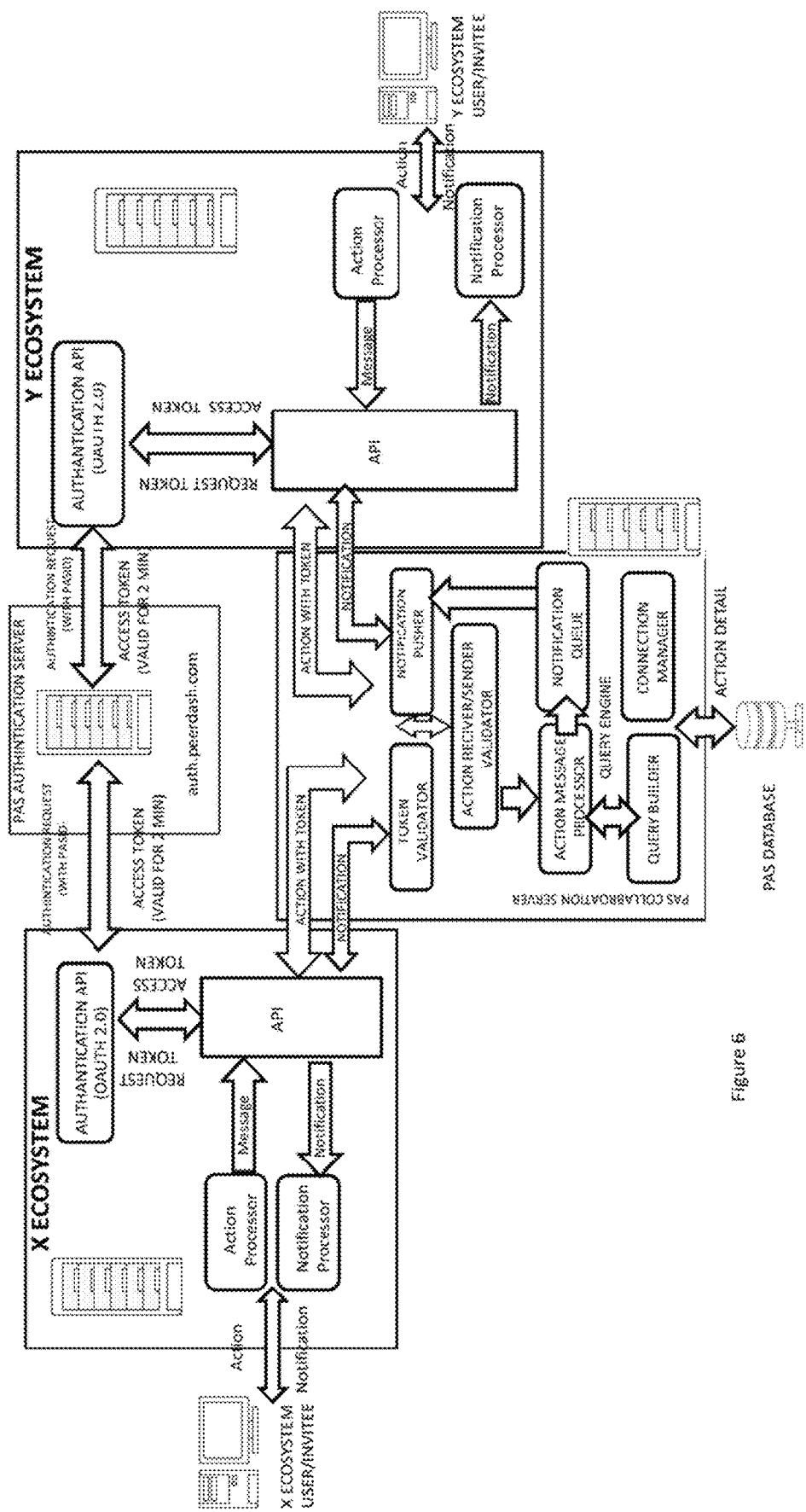
FIG. 6 depicts an exemplary PAS and notification dataflow.

A PAS collaboration server can be used to facilitate collaboration requests and/or notifications between ecosystems, as shown in FIG. 6. This can be useful, for example, when User A attempts to collaborate with User B, and both users belong to different ecosystems. The PAS collaboration server can include a token validator, a connection processor, a notification queue, and a query engine. FIG. 6 depicts additional exemplary elements of a PAS and data flow during ecosystem-to-ecosystem notification.

Administration

The simplicity required to effectively administer a knowledgebase can be directly related to an application's ability to decentralize administration and curation, which can increase stakeholder participation, reduce administrative bottlenecks, and lower transaction costs. With some prior apps (such as Dropbox), a dedicated IT manager is required for a branded platform. For others (such as Yammer), IT staff is required to manage and maintain supporting apps and databases. Prior aggregated/communications apps generally require additional user training due to the difficulties in learning and administering multiple external apps. Complexity is increased with role-based permissions (versus content-level permissions tied to identity) as well as engagement costs associated with the ongoing administrative review of files, connections, and collaborations. Present embodiments can address such problems by providing a centralized CMS with decentralized administration, both of which can be scalable. Additional advantages can be gained from stakeholders sharing responsibilities, from sub-administrators to user-generated content, including annotating, hash-tagging, and/or contextualizing, etc.

Embodiments can incorporate human design principles in a UX with architecture that can facilitation the aggregation of the knowledgebase. Although embodiments can function like a scalable CMS, the platforms can be designed to mimic social media functionality to achieve simple usability and administration. A range of content-related permissions can be employed at each user/owner level. Admins/sub-admins can set user permissions (share, collaborate, and/or publish) and can automate administrative review procedures. Administration of groups can be assigned to users within an organization or external collaborators for virtual ecosystems and multi-stakeholder collaboration. Users can manage their own content—from uploading and organizing, to annotation and publishing—within their security parameters. Organizations can leverage in-house and partner resources, review workflow and business decisions, and efficiently participate in cross-organizational projects. Embodiments can facilitate geographically diverse ecosystems, each with different roles and responsibilities, to achieve common goals. Administrators can create sub-administration with one click, giving ecosystem partners control over their own stakeholders. The actions of both sub-administrators and users can be monitored, e.g., at the administrative level. Review and approval capabilities for external communications can be handled in real-time (e.g. notification/approval of individual action) and/or by pre-setting user permission controls for a class of stakeholders. A cross-organizational level of hierarchal control can task users with a broad spectrum of responsibilities.

Embodiments can be configured to facilitate the creation of ecosystems. For example, an administrator can first create an ecosystem. The name and description of the ecosystem, and if desired a logo, can be chosen and/or uploaded. Users that will be neighborhood admins can be added. Both ecosystem and neighborhood admins can add users, if desired. Adding users can follow the same process as neighborhood admins, but users should not generally be given admin roles. Use permissions can be chosen so as to allow users to upload and/or share (e.g. to social media). Users can be restricted when added. This can be ideal for outside collaborators. For example, by allowing upload but not share, such outside collaborators can be prevented from speaking for the organization through social media and/or publish boards. Once neighborhoods are established, user roles and affiliates can be edited. This feature can be ideal for rotating stakeholders. Profiles can be created and edited. Profile photo can be directly uploaded and profile fields filled in. Areas of interest/expertise associated with users can be utilized to increase SEO. A user's social links can be standardized, and internal organizational profile demographics can be include and made private for analytics uses inside the organization.

Users can be given personal user pages. Pop-up menus can be utilized to add boards, including titles (e.g. having less than 25 letters) and description (which can utilize use hashtags for SEO). Boards can originate as private and can be changed via permissions. Curate (or collection) of Web content can be facilitated by drag-and-drop functionality, such as a Curate It! button on a tool bar. New Boards can also be created while curating. Users can upload documents and/or media to boards. Users can also give upload permission to other users. Subscribe and follow functionality can be incorporated to, e.g., build libraries—either for a user's own page or a page that the user administrates. Subscribed boards can automatically appear in the user's page, e.g., in a panel under a subscribed tab. Collaborative boards from other users can also appear under such a Subscribe tab, and alerts to the user of new content can be generated and sent to the user. Followed pages can appear on the user's page or under a tab as well.

Neighborhood pages can be created. Title and descriptions of the page can be included by Admins or authorized users. Admins can use drop down menus to switch pages for editing and adding announcements. Embodiments can include collaboration features. For example, to connect to other users, a search tab on a user's page can be utilized to go to a user page and/or to select to connect. Connecting with other users can create a contact list. Buttons can also be incorporated to choose to chat, message, and/or block a user. Board permission settings can be utilized to invite others to a user's board. Ecosystem publishing can broadcast boards to the entire ecosystem or to specific users. Users can be controlled from when they are added (e.g. to allow upload but not sharing). Neighborhood admins can then use board permissions to invite collaborators to upload, while still controlling publishing and sharing abilities. Admins can review boards and content sent to trash by users. This can give Admins the opportunity to avoid data loss. An example of an admin window showing permissions for different user levels can be seen in FIG. 13.

In some embodiments, board owners can automatically share content that is public to public media outlets, while a collaborating user can only share to public media outlets with a board owner's permission. Boards can only be shared to public media by a member of the ecosystem or public when boards are set to public. Content within boards that is not public can be hidden and not seen by public guests. Content (both Web-based and uploaded) that is public can be seen. Embodiments can be configured such that only public content that is web-based can be shared individually to social media but not uploaded non-private content. If a collaborator is permitted to share at the board level, email sharing can be made available for individual pieces of web content. Users with permission can comment, like, and share. This feature can track workflow, e.g., on collaborative boards. The system can act as a publishing platform, e.g., when board links are shared via social media or email. Guest users can be limited to only seeing collaboratively shared or public content. Both public and ecosystem users can be allowed to search by multiple variables. A user page can include a panel showing an activity feed. The feed can be controlled by neighborhood admins and/or comprised of elements including: announcements, created by neighborhood admins; neighborhood activity, which can be an automatic feed of published boards (ecosystem and/or public); and social media feeds, such as a Twitter feed, and can correspond to social media links given for the user's page profile.

Workflow

For both communication and FSS apps, one goal is greater efficiency in workflow and collaboration. But, while machine interoperability has been proffered as an adequate replacement of human interact-ability, collaboration has been limited by artificial constraints. When most people think of collaboration, they immediately think of projects and teams—and, while this is a good example, it has limited our way of thinking about human collaboration. Instead of focusing on how humans work together on projects (e.g. research, sharing of knowledge, providing input, harnessing human capital), current collaboration apps are only capturing files within projects, and relying on the ability of searching to locate them if and when they are needed at later time—similar to email. The end result is not a human curated knowledgebase that can be archived and leveraged, but rather loosely affiliated work product folders.

Embodiments can address these deficiencies by implementing a content-centric system. For example, all files and folders can be manipulated, monitored, and/or read for analytics, and interoperability via an API can be mapped. Accordingly, embodiments can foster customer growth. Analytics need not be a question of what can be read, but rather, what does one wish to know about—e.g. the behavior of users, departments, content, public interaction, etc.—because the content can record all transactions. The interoperability of APIs can include exporting files to social media sites and blogs and connecting to competing models (such as Dropbox and/or others). APIs can also facilitate more detailed integration, for example due to the content centric nature of the system.

File Sharing

When sharing files, an important security concern is how content is shared and accessed. Emphasis has been skewed toward system inter-operability between database and attendant applications rather than human interact-ability between users. In such systems, security of user data is balanced against the needs of systems to interoperate. As more applications are plugged into such systems, the integrity of database security is typically weakened.

Certain architectural principles—including role-based access permission and central login—have been considered best practices. Such premises, however, are based upon legacy file structure systems and need to be examined for their viability in modern systems such as in cloud-based systems. Examples of such principles bear examination or are no longer valid can include: a central OAuth-type system; the convenience versus security myth; and two-step verification in transferring files.

Normally, a central login, or OAuth type system, can allow users to sign-in to multiple apps with one user account, e.g. Facebook, and is often considered necessary for cloud computing. For security conscious organizations, however, such apps often violate information protocols as all access-based information pertaining to the user is typically stored on the application, including: username and password schemes; specific usernames and affiliated passwords; and file locations and authorizations. Cloud hosting is often implemented simply as a server someone else manages, which means that the security of the data is held by a third-party—even if hosted as a private instance—which connects all organizations through a centralized OAuth type system, containing the decryption keys to all stored data.
Some embodiments overcome this problem by implementing a federated cloud knowledgebase, in which all access information can be held on the organizations private server/instance, i.e. not on a central app server. This type of decentralized system can require that user names be independently generated on disparate systems that can be used, but not decrypted, by a central server.

Another, often minimized, issue of file sharing that arises in the context of cloud computing is the convenience versus security myth. Most FSS models are secure only if roles within the organization are hierarchal and clearly delineated. Problems arise when nested files become complex flow charts of information, and secure sharing cannot be achieved within the system. When this happens, administrators are often tasked with reviewing all folders and documents linked by roles to collaboration requests, creating administrative bottlenecks and increasing transaction costs; creating multiple, task-specific folders and/or duplicating files within limited-sharing folders, resulting in new silos and destroying context; and/or sending documents outside the system in an unsecure manner (i.e. two-step verification). Regardless of which ad hoc solution is attempted, both aggregation style and file storage model cloud apps can break down when information begins to scale. For example, the two-step verification procedure is generally employed by all previous file sharing SaaS models. In this model, however, security is sacrificed for convenience. Most previous cloud-based business productivity apps mask serious security problems within terms of art, such as risk adjusted. Such protocols reveal inherent security flaws that are both a threat to IP and a hurdle to scalability.

Embodiments can include cloud-based collaboration and a content management platform where access permissions can be directly on the content. Both individual files and curated folders (i.e. boards) can hold their own permissions, independent of roles, which can be set by the user/owner, limited to user permissions set by the administration. Unlike forced hierarchal folder models, content-based permissions can give both users and organizations greater flexibility in creating practical work groups on-the-fly, while reducing administrative bottlenecks.

Traditionally, documents hosted in clouds have been accessible via URL and, as cloud apps developed, linking replaced sending as a means to share content. Sending a link is not secure. For example, links can be copied, redistributed, and/or stolen. Accordingly, most cloud apps have implemented a two-step verification procedure for private sharing. In most cases, this involves emailing an allegedly secure link on a separate channel (e.g. email), and either providing an access key (via another channel for security, e.g. text) or setting a time-out mechanism, or both. The myth of the two step verification lies not in the security of the double handshake itself, but rather in how it is executed. The two-step protocol typically tasks users with keeping track of multiple keys on other systems. But the fundamental nature of a system utilizing permissions sent externally over emails or texts or distributing exposed URLs cannot be considered a secure file transfer system. This also directly affects scalability. For example, on some previous systems, file hierarchy has required an adherence to a security protocol. Using keys to include additional viewers can create administrative problems that preclude meaningful stakeholder adoption.

Embodiments can be implemented as cloud-based collaboration and content management platforms that do not require external channels for secure collaboration. In such embodiments, access permissions can be granular and tied to the content so that ideas can stay together. Individual boards and files can be hidden from viewing when a user lacks access permission. Two-step authentication can be achieved seamlessly, and users need not keep track of files, keys, and/or links.

Embodiments can achieve secure IP and file transfer. Permitted users can create secure local and network folders that are synced for secure file transfer. Access permissions can be set and edited by the content owner. Workflow and/or dealflow can be managed by access permissions. Content can be organized and maintained as well as can be released all at once or as relationships or projects develop. Collaborative curations can provide a secure platform for privately communicating large amounts of contextualized content (e.g. reporting, research papers, documentation and media) in industry sponsorships, strategic alliances, and cross-institutional collaboration.

In contrast to the inter-operability model, which approaches user experience from a machine structured processes, the interact-ability model can utilize a human-centric user experience that is integral (i.e. baked-in) to the design. Embodiments can utilize a central login because the unique architecture of certain embodiments does not impose direct control on user information. All access and permission information can be stored on an organization's private server, whether virtual or hosted by the organization itself. User identities can be generated on the organization's private server/instance.

Accordingly, multiple databases can connect from hosted databases to those behind security firewalls and to those that require Lightweight Directory Access Protocol (LDAP) or other private identity schemes. Such architecture can be a key feature of a central server providing a secure, federated cloud knowledgebase. Unique user identities can be hidden from a central server using multiple, organizational-specific, random encryption techniques. If the first value proposition of the secure file transfer protocol is the unique PeerID system, the second can be content-based permissions.

Figure 12:
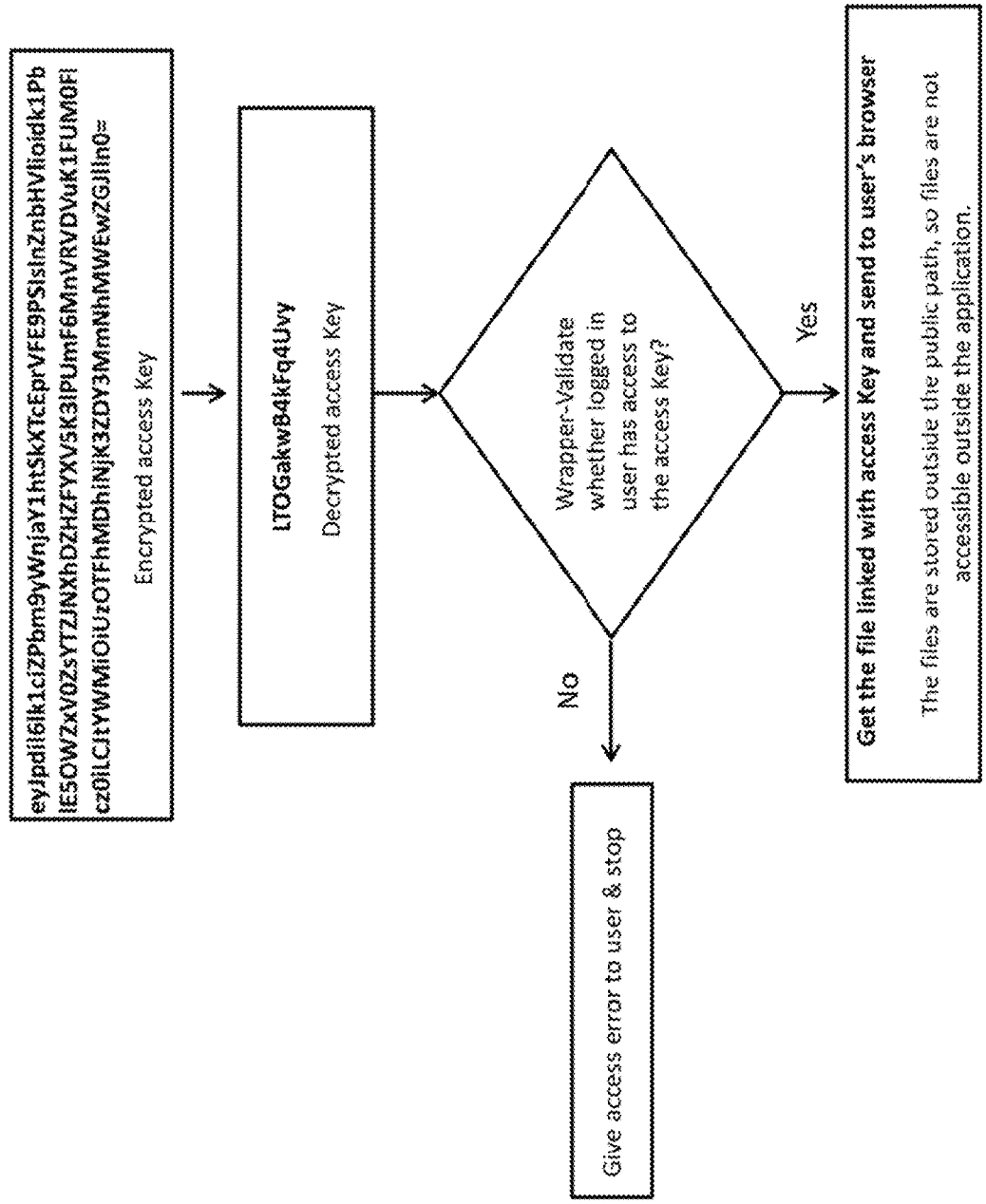
FIG. 12 an exemplary file sharing security flowchart.

A file sharing security system can preferably include multiple levels of security. For example, files can be stored outside a public path, preventing direct access to such files, with the filename outside the application. In some embodiments, filenames are nowhere used in the application, but instead AccessKeys can be used, which can be random strings mapped to the filenames. Each AccessKey can be encrypted, e.g., using strong AES256 encryption via the mcrypt PHP extension before passed to other users. An exemplary file sharing security flowchart is shown in FIG. 12. As shown in the figure, if a user wishes to share content (e.g. a file) by sharing a URL, several security steps can be taken. If the system cannot validate whether the logged in user has access to an access key, the system can generate an error and/or prevent access.

If a user saves any critical or confidential files in the system, the file content can also be encrypted using strong AES256 encryption, e.g., via a mcrypt PHP extension with a dynamic key before storing into server. Accordingly, the system can be configured to prevent access even by system admin or other higher level users. When a user selects to encrypt content during or after uploading, a random key can be generated and stored with respect to the content. The content can be encrypted with the random key before storing in server. The system can also be configured to generate an error stating that a file in the server is corrupt if an unauthorized user attempts to open the file in the server. A random/dynamic key can be stored in the secure database, and so a periodic backup of database may be required.

Communications

Previous business apps generally fall into two classes: social business tools and file sync and share (FSS) tools. Social media tools generally focus on written communications, and content, whether hosted or linked, is typically ancillary. Conversely, FSS systems are designed for content sharing with limited human interaction beyond direct document collaboration. A problem with these two approaches is that reconciling the two often requires the interoperability of multiple apps. Such additional levels of aggregation (content and communications) usually require multiple licensing agreements, increases security risks, and invests the organization in a suite of products that will soon become redundant as software moves to the cloud. Embodiments can focus on the interact-ability of the users, rather than the interoperability of third-party feature apps, and can include a full spectrum of communications and content level sharing with the added value of anticipating organizational needs by allowing creation of a user-generated knowledgebase with minimal oversight that can be leveraged internally to publicly.

Figure 7:
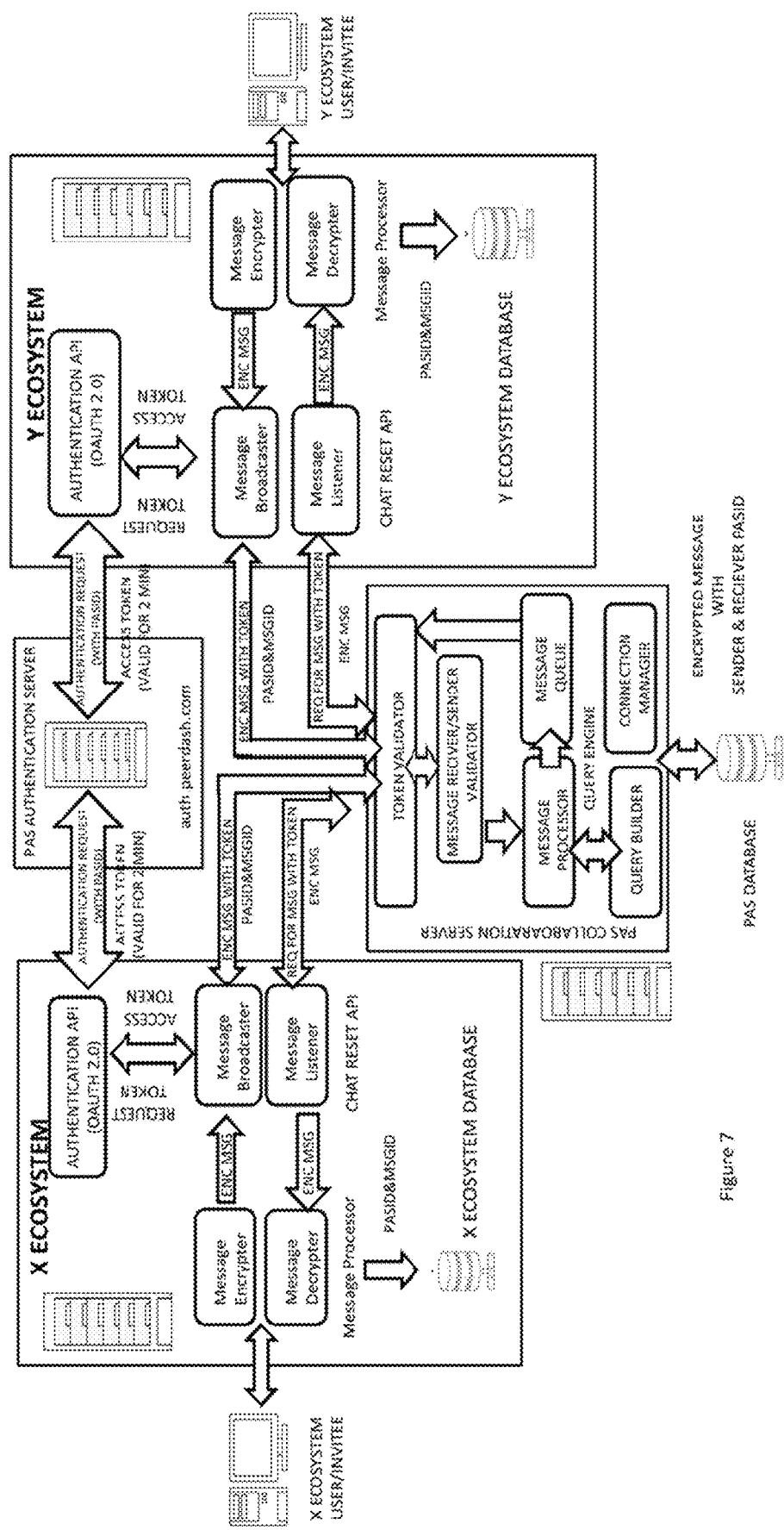
FIG. 7 illustrates an exemplary embodiment implementing ecosystem-to-ecosystem chat and messaging.
Figure 8:
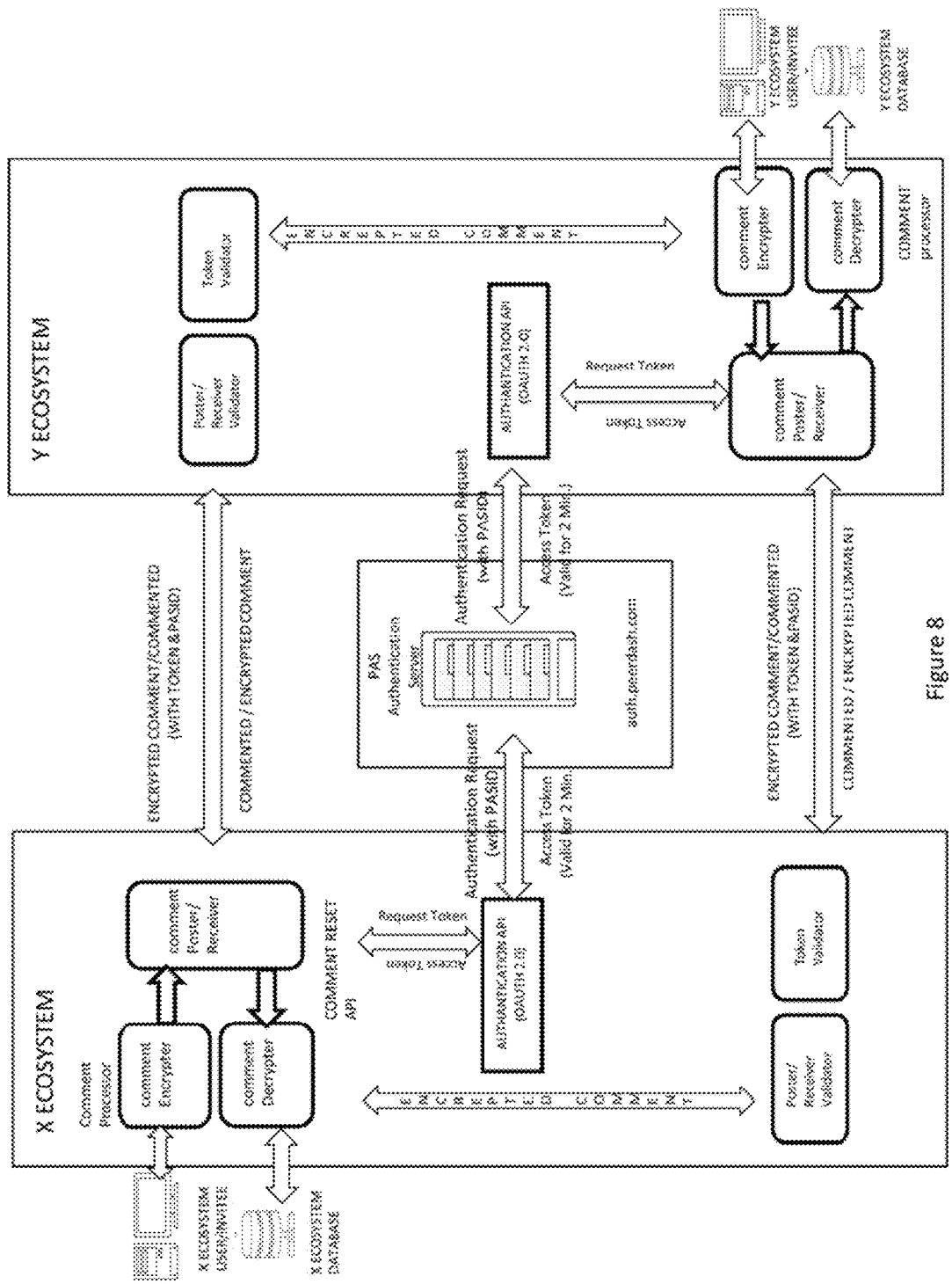
FIG. 8 illustrates an exemplary embodiment of ecosystem-to-ecosystem commenting on content.

Embodiments can include instant messaging (IM) to allow centralized, real-time communications between institutional users and/or authorized, outside collaborators. FIG. 7 illustrates an exemplary embodiment during ecosystem-to-ecosystem chat/messaging. Automatic curation/project updating can keep subscribers/collaborators informed and up-to-date, and automatic alert notifications can be sent upon the addition of curations and/or changes to projects. Collaborative curations or collaboration project requests can be handled by authorized users, and need not require administration, increasing workflow productivity. FIG. 8 illustrates an exemplary embodiment ecosystem-to-ecosystem commenting on content.

An effective knowledgebase can include an ability to manage content. Previous FSS and communications apps generally fail to anticipate the full lifecycle of content management. Present embodiments can implement an effective knowledgebase with increased manageability by facilitating efficient content discovery. Users can subscribe and/or follow, post to social media, and/or use the platform itself for publishing pages with real-time feeds, SEO, and robust search capabilities. Whether the data is shared between a small group of people, throughout the organization, or publicly, the platform can keep ideas contextualized while granular level content permissions can decide who can view, edit, and/or comment. A centralized UX can allow organizations to create searchable, branded platforms that can be publicly accessed. Security features inherent to the architecture allow organizations to invite participation without risking data leaks.

Users authorized by an organization can create a digital library of research, organizations, and people that can be discovered and followed or leveraged by stakeholders of the organization. As a user-created knowledgebase, users can be tasked with categorizing and/or describing (e.g. editing metadata of) content added to the CMS. Projects and curations can be published on or by the CMS. Published content can be attributed to its owner, further contextualizing people with ideas that can be followed by potential stakeholders. These can ensure that ideas and/or contextualized data can be discovered through searching. Connections can develop into long-term economically beneficial relationships. Subscribed content can provide the most up-to-date information, fostering sponsorships, and industry cooperation. Collaboration tools can go beyond sharing to foster social media-like exchange and development of ideas. Privacy settings can allow for the secure transfer of IP to select individuals. As a central platform with decentralized tasking, published content can become a media rich library for individuals and/or organizations to socially engage and amplify an organization's messaging. Further, present technology can reduce engagement costs, maximize institutional HR, and/or amplify human capital, fostering cross-discipline to interinstitutional collaboration.

Figure 9:
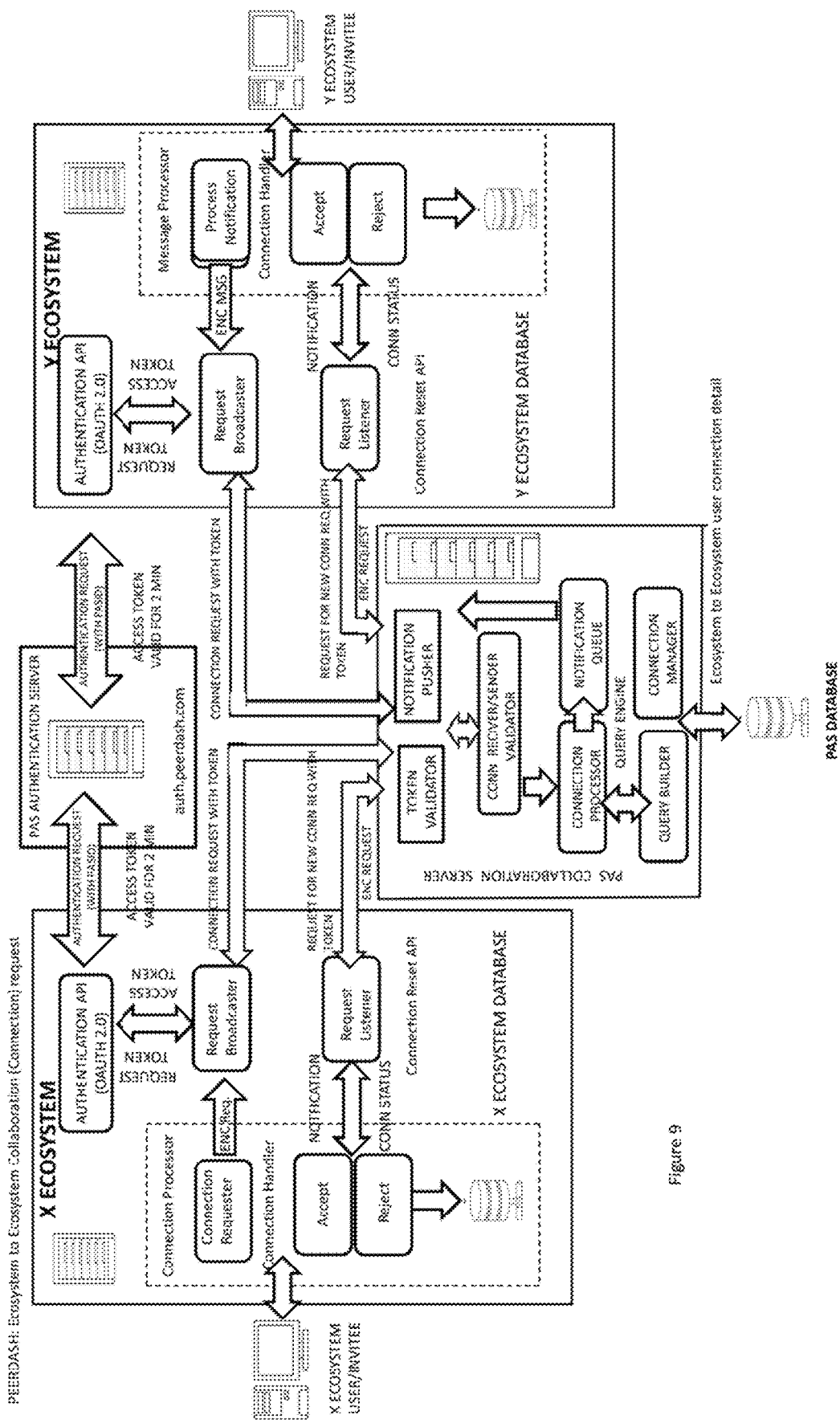
FIG. 9 illustrates an embodiment for ecosystem-to-ecosystem collaboration/connection requests.

Embodiments can be customized to serve an organization's mission. FIG. 9 illustrates an embodiment that includes ecosystem-to-ecosystem collaboration/connection requests. Private collaboration and knowledge transfer can foster cross-institutional research, resource sharing, and commercialization by-and-between individuals, groups, organizations, partnerships, and/or institutions. Embodiments can be searchable for media-rich knowledgebase of resources, and messaging can be amplified, including recruitment, news, and/or initiatives.

Project access permissions can allow sharing to a limited number of contacts, inter- to cross-institutionally, or even publicly. This can be used as a means to educate and/or inform. Embodiments can autonomously build timelines of collaboration projects and/or allow users to generate timelines. The platform can allow invited users from within or outside the organization to comment and upload files to group projects, creating, e.g., a record of business decisions. Authorized users can create informative and/or training presentations with drag-and-drop functionality. Presentations can be shared within groups for collaboration or published globally, e.g., for SEO purposes.

User pages can include institution branding. Administrative controls can decide the publishing rights of individual users or groups of users. In some embodiments, all private content can only be shared public media outlets by the owner of the content (provided user is allowed). In some embodiments, public content can be shared by any user and/or the public at large, amplifying social media efforts. A user's public content can be optimized for SEO by the user, increasing searchability of content. Content can be subscribed to—and leveraged for social media—by an organization on its public page, reducing marketing/administrative workload.

Large media files and documents can be uploaded into marketing and sales repositories. Content can be updated for up-to-date, easily accessible materials. Organizations can leverage the organized, contextualized information, and the knowledgebase, to create press kits, recruitment pages, newsletters, etc. A searchable secure database can also allow quick reactions and responses to current events, with existing or automatically updated content, aggregated by users or stakeholders.

The knowledgebase and content management system can increase cooperation, foster collaboration, by and between organizations and people. Multi-level and/or multi-institutional involvement can be achieved with a centralized repository that can be accessed by many stakeholders, in many institutions. Additional collaboration and publishing tools can also be included, as well as security designed for storing and/or transferring IP files. Many organizations, however, can be challenged by resource and administrative shortages. Present embodiments can effectively marshal cross-institutional resources by, e.g., including democratic, or decentralized, functionality. For example, embodiments can include a privately installed, branded platform for ecosystem management, interinstitutional collaboration, and/or amplification of stakeholder collaboration. The embodiment can include a centralized knowledgebase, CMS, secure access permissions, and/or social technology for intra- to inter-organizational knowledge transfer, file management, and/or social publishing.

Whereas prior inter-enterprise technologies can limit participation and put stresses on administrative workload, present embodiments can allow users to curate (e.g. collect and organize files, media and web pages) complex ideas, such as research or due diligence and/or to create collaborative projects with social work-flow that can provide a clear record of decision-making for group projects, research, and teams within or across multiple organizations. Present embodiments can be implemented to enhance security and IP protections. For example, systems can be installed on an organization's servers, negating external vendor security concerns. Access permissions can reside on the content level, and access to files through independent URLs can be prevented. In a preferred embodiment, all user files, curations, slides, and projects can be private by default, but also can be shared selectively, collaboratively, and/or publicly as desired by users and/or administrators. Selective sharing can include secure knowledge/IP transfer via platform controls utilizing granular-level IP protection. As an example, authorized users can create their own synchronized file storage space (e.g. a Dropbox-like folder) for secure file transfer and individual and/or group review. Collaborative sharing can include secure platforms for privately communicating among a group or organization large amounts of contextualized content, such as reporting, research, documentation and/or media for industry sponsorship, strategic alliances, and/or cross-institutional collaboration. Public sharing can utilize social media and/or publishing as a resource to an organization's branded platform, which can be leveraged by and for institutional use, such as industry sponsorships, strategic alliances, cross-discipline research, program recruitment, and/or media-rich learning.

Some embodiments can be implemented as single platforms for workflow and communications. Such platforms can reduce transaction costs associated with multiple legacy technologies and administrative workload. Administrators can set user-permissions and create a secure environment for users to virtually collaborate without admin or IT assistance. This can foster cross-institutional research, commercialization, and multi-institutional projects. The platform can include a crowd-sourced database to further reduce costs associated with developing and maintaining a digital library of stakeholders, research, and institutional resources.

The platform can amplify a group's messaging by, e.g., aggregating its combined resources. The decentralization of tasking and responsibilities can provide transparent workflow for simplified administrative oversight and peer or team review of research, proposals, due-diligence, documentation, and/or ongoing reporting. Secure file transfer coupled with database technology can negate expensive legacy products and external vendors, and can be adapted for marketing solutions or ad hoc product suites, which otherwise could violate IP transfer security protocols.

Embodiments can include multiple channels, built in search engine optimization (SEO), media capabilities, and/or visual Web 2.0. These can improve engagement through search ranking, content tagging, and/or intuitive discovery interfaces. For example, stakeholders, users, researchers, etc. of an institution can build digital career portfolios with CVs, social links, media, digital files, and/or web links. Profiles can also be searchable by various criteria, such as organization, skills, and/or areas of interest, facilitating stakeholders' connections through the platform or via links to profiles on Facebook, LinkedIn, Twitter, or other social media. Potential financial stakeholders or other interested parties can search all published public content as well as non-public content that such persons have permission to view. The platform can also allow following of an individual or body of work. Users can also have a multi-media platform to respond to current events or public questions in a comprehensive, contextualized format. Data feeds from media outlets, such as government sites, can be served via an API. Such feeds can be viewed and/or followed through the platform.

Embodiments can reduce administrative bottlenecks and decentralize workloads. Moreover, they can be implemented with user-friendly and/or intuitive graphical user interfaces (GUI) such that social tools need not require technical expertise, increasing stakeholder participation. Through permissions granted by an administrator, authorized users can manage their own content and/or projects, invite collaborators, make connections, network, and/or amplify messaging. A directory can be utilized, which can allow public users to locate other users, such as researchers or start-up entrepreneurs, in order to connect with them and/or follow their work. Organizations can leverage published stakeholder content for, e.g., marketing, education, and/or increased access to resources.

Embodiments can include various core features, such as administrative controls, decentralized functionality, curation, social business tools, access & sharing, metadata & SEO, and/or search & follow. Administrators can control page branding, user permissions (e.g. editor approval before publishing), and/or public organizational/departmental pages. Each authorized user can maintain his or her user account. User account limits (e.g. for sharing and/or collaboration), properties, and functionality can be set by administrators. A user can upload files and collect content into curations, i.e. multi-source, multi-media folders, which can be linked to the user's profile. Users can also create slide presentations, connect through chat or organizational email, and/or create virtual work spaces for multiple, decentralized collaborators. In a preferred embodiment, all content can be saved as private, and users and/or administrators can permit selective access (e.g. for file transfer and/or collaboration) or publish, such as to a social medium. Metadata can be edited by the content owner or uploader, such as by means of clickable buttons on a GUI, and can be optimized for searching. Users can publish curations for potential stakeholders or other interested parties to search and/or follow.

Embodiments can also include various customizations, such as to enhance security, searching, publishing, and/or analytics. For example, embodiments can incorporate one or more of the security protocols described herein and/or as are known in the art. Customization can further include user interfaces having customized search fields, categories, and/or content mapping.

Figure 10:
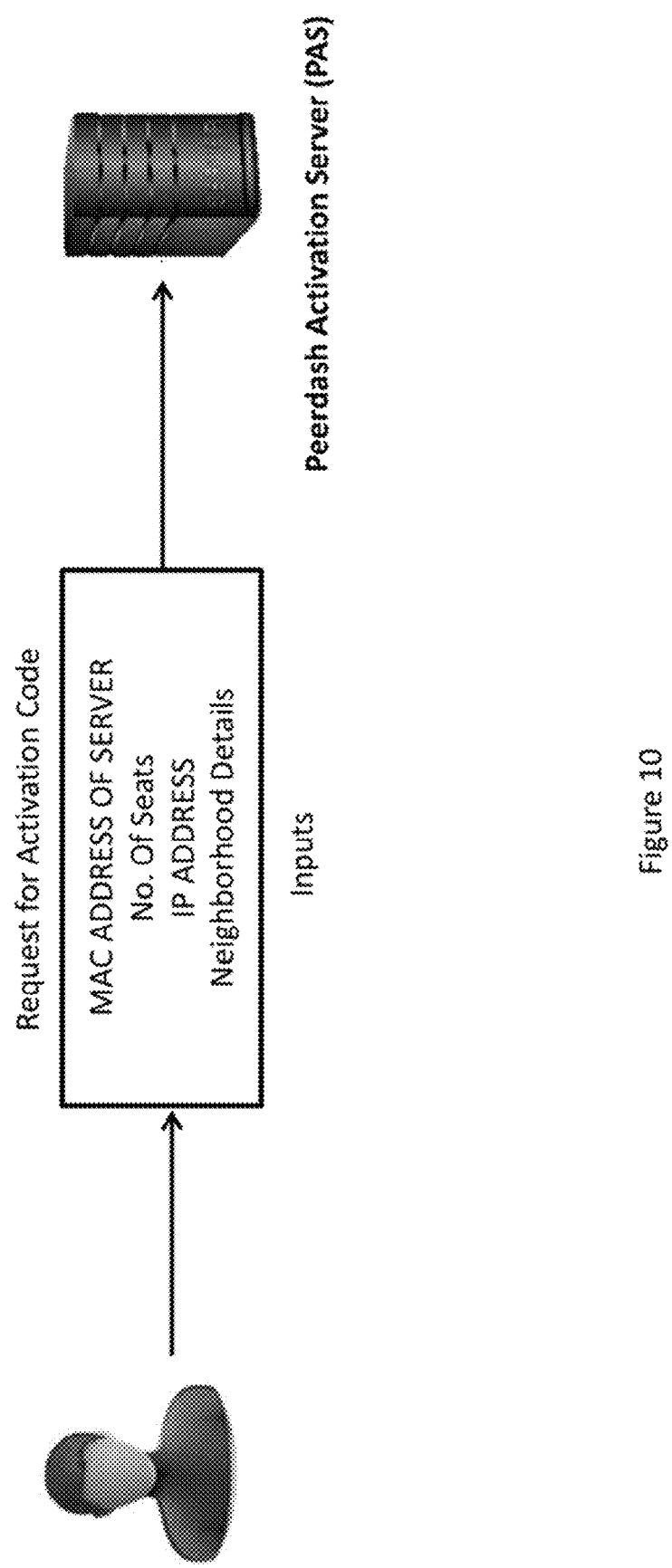
FIG. 10 depicts exemplary activation process and neighborhood identification.
Figure 11:
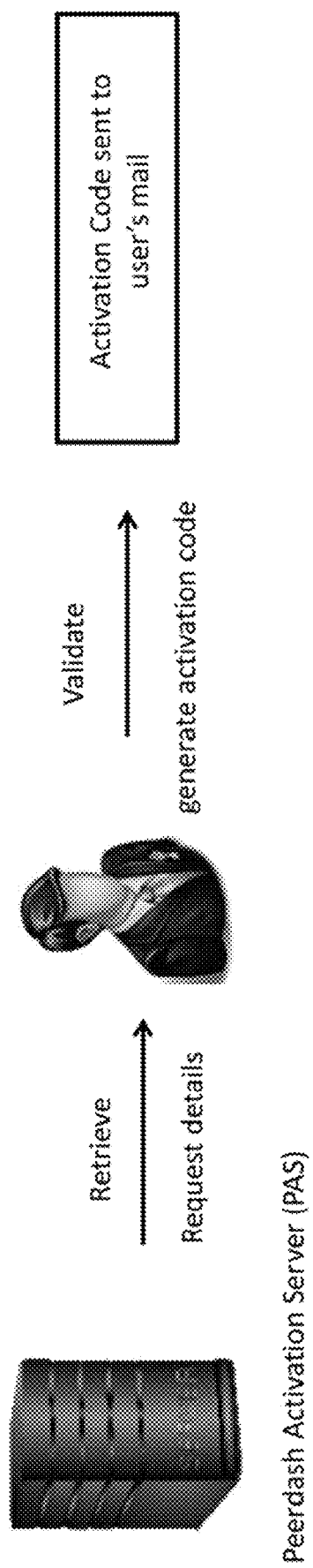
FIG. 11 depicts exemplary activation process and neighborhood identification.

FIGS. 10 and 11 depict aspects of exemplary activation process and neighborhood identification. In a first step, shown in FIG. 10, a system admin request can be made for an activation code by filling in a form from a proprietary website and/or an intranet location. Form inputs can include a unique identifier, such as a media access control address (MAC address), the number of seats, an IP address, and neighborhood details. In a second step, as shown in FIG. 11, an admin can validate the input given by a user and generate an activation code. The activation code can be a unique, random string. After installing the application, the system admin can feed the activation code and activate the application. A PAS can validate the MAC address of the system where the application is installed and the number of seats. In a third step, a neighborhood ID can be generated. Once the activation code is activated successfully, a neighborhood ID will be generated by the PAS and sent to the application. The neighborhood ID can be a unique random alpha numeric string (e.g. 16 char). Each neighborhood ID can be mapped by MAC address, number of seats, IP address, and/or activated timestamp. The MAC address can be encrypted and stored as encrypted text or as a hash value on the database. The system can also utilize PeerID, which can be a unique random alpha numeric string (e.g. 16 char). Each PeerID can be mapped by neighborhood ID, IP address, PeerID generated timestamp, and/or browser details such as browser name, user agent, HTTP_ACCEPT header, browser plugin details, time zone, screen size and color depth, system fonts, and/or cookies. Brower and system details can be stored by PeerID, for example, to validate whether a user uses the same system for each instance.

In some implementations, a system and method encompasses both hardware and software to direct authentication, sharing and retrieval of digital assets through Distributed Ledger Technologies (DLT). These implementations may include a Decentralized Application (dApp) for real-time control, validation and revocation of files on distributed servers by and between public and proprietary blockchains; as a ledger compiler, and/or as a methodology for secure interoperability for Distributed Ledger Technologies (DLT). Applications of this technology includes the ability to aggregate multiple ledgers or blockchains for authentication, provenance, and tracking; digitally replicate (for read and/or write) content referenced in ledgers or blockchains; send cryptographically secure file tokens to ledgers or blockchains for authentication; and track and/or control files referenced in ledgers or blockchain—regardless of whether they are shared digitally or as physical objects. Systems and methods herein describe a dApp that achieves this level of flexibility because of its unique, content-centric architecture and native tokenization, allowing it to be used as both a distributed ledger of record on a public or proprietary blockchain, and as a content controller or compiler on the blockchain or other decentralized platforms.

The goal of DLT is the ability to create trust in a world of automated microtransactions and/or legally enforceable actions, including, but not limited to contracts, negotiations, and intellectual property creation. Blockchain—and dApps generally—create decentralization with a shared ledger of record. The idea is that files can be secured locally while the ledger is shared by all ecosystem participants. However, the architectures currently used in these shared ecosystems (whether public or proprietary) often do not live up to the promise, and in fact, lack the confidentiality necessary for proprietary idea sharing. Confidentiality is the security that comes from holding your intellectual property separate from all other participants in a system. This is also what blockchain promises with decentralization, however decentralizing transactions has proven a lot easier than decentralizing digital assets.

Intellectual property, legal instruments and negotiations cannot use a system that relies on competitor validation, centralized control, or shared storage. This is also why some consider blockchain stalled, because while most structured, linear interactions can be computationally executed on the blockchain, unstructured decentralized knowledge sharing has yet to be realized outside of simple ledgers of ownership.

Implementations herein include a Peer dApp methodology that leverages both software and hardware for smart contract interoperability and functional capacity, independent of the root content file. The Peer dApp starts with an independent Content ID, constructed and hardened locally, as non-fungible or semi-fungible tokens, created by both software and hardware, making all subsequent machinations independent and action-enabled through tokenization. This methodology enables blockchain-enabled multi-ledger interoperability with secure, digital twinning of content negotiated and represented on the blockchain, including the ability to share, revoke, validate and monetize files globally.

It also enables parent/child blocks that can be controlled long after they are issued, and even deprecated as legal assets.

For example, the Peer dApp may be used as a digital rights management (DRM) tool and/or as a secure inter and intra organizational file sharing platform. In some examples, the Peer dApp is a file and asset watermarking solution, a public authentication portal (proprietary or social media), and/or a provenance and authentication solution. The Peer dApp may be used for a myriad of other specific use-cases requiring real-time, content-level permissions, as discussed further herein.

Because the Peer dApp creates a user independent token from the creation of the record, it can be decentralized and layered with additional security measures; such as Zero Knowledge Proof (ZKP) tokens, bio protocols, or the security of one-time uses, such as Virtual Data Rooms (VDR). The Peer dApp may also be used to integrate container storage or server arrays through blockchain methods, or even private blockchain authentication onto public blockchains.

In the past few years alone, millions upon millions of people have had their information exposed via various hacks. Meanwhile, other dangerous attacks, such as ransom attacks, are also on the rise. This keeps happening because no matter how many firewalls, passwords, and riddles placed in front of a file, current systems are still securing people, not content. Distributed Ledger Technologies may be the cure, but conventionally, the underlying database architectures have exposed those new systems to known problems and compromised security.

Blockchain technology has burst onto the scene, offering an immutable record, shared by everyone, and owned by no one. This is why coin exchanges and simple contracts tended to be the first real blockchain applications and why blockchain has facilitated the Internet of Things (IOT), as an automated series of events holds immense promise. While blockchain is an excellent ledger for transactions—ensuring the business ecosystem participants have access to a headless authentication mechanism—it does not scale to other business processes without middleware, or decentralized applications (dApps).

Current ZKP strategies start with a dummy token which is a computational problem that must be solved using encryption. It is an authentication exchange, i.e., a proof of knowledge scaled down probabilistically to an Argument of Knowledge (ARK). Current ZKPs' mathematical key exchange is based upon probabilistic parameters with cryptographic complexity, a private, hash value and additional public private keys, or multiple levels of publicly available encryption for authentication only.

Generally, ZKP is a cryptographic methodology for transferring information where the authenticator does not know the contents of the message—or has only authenticating information. For example, a question "does this person have a legal license?" has an answer "yes." Note that the questioner does not have access to age, address, driver's history, etc., making this useful for an array of legally constrained applications.

The hope of ZKPs is to be able to query information on the blockchain like layers of an onion—with data from the original file segmented by permissions. To expand upon the above example, a police officer may be able to access a license number of a person while a bartender may only access the persons age.

It is easy to see how this is an appealing architecture—a promise of integrity, accessibility and confidentiality. However, current efforts, as applied to digital files and media content, are limited. Using current ZKP strategies for file exchange, collaborative workflow, or media and research development merely places gamification on top of a file location. It is not difficult to extrapolate the issues, since like all other near-hit solutions (including two-factor authentication) the same security problems belie success, like foundational data security and confidentiality.

Although most dApps can decentralize the administration of content, there are very few solutions that secure content or media, beyond the level of current interoperability. Using dApps for content sharing does not change the risks inherent in their overarching architectures. For example, data lakes are often used in dApps. The controls are decentralized, but the files are in a shared server or schema that makes location apparent to other ecosystem IT departments. Recent failures illuminate inherent dangers of sharing IT liability in decentralized applications—the loss of confidentiality through no fault of the IT team or company. Other solutions, such as an international URL protocol for hosting files (not for confidential IP) and virtual data rooms, even when not leveraging data lakes, still inherit the public/private key security issues that have plagued content and digital rights management for over a decade. Additionally, because these systems are generally hosted in nodes, mitigation from liability is sold as "best practices," but human fallibility and corporate greed easily overcome security morals when proprietary data can be easily accessed.

Blockchain purists insist that to create public transparency, publicly known encryption should be used to place a transaction on the blockchain. In contrast, industry leaders are concerned that quantum processing will ultimately be able to break these algorithms and prefer to introduce a known/unknown variable. Currently, most ZKP architectures rely on a private hash provided by the application or by the node. The problem with this approach, however, is although the encryption being used may not be known by the public, it is known by other ecosystem participants. This means trust is dependent upon the participants and/or IT administrators.

One approach, the Zexe protocol, has contemplated a unique hash value that includes, for example, a binary of "birth" and "death" for the opening and closing of a file. That is, it includes user defined parameters of condition precedent for the creation of a new block. This 'Action as a Value' (not file location) is a great approach. The problem with this approach is not the mathematical computations in the ZKP, but rather the order of operations. What the Zexe protocol does not take into consideration is, if a record (R) can exist before any action it can remain unbound, and therefore controlled locally and in real time. For example, even when tokens or blocks have been issued, they can be revoked—likewise, this creates a duplicate, viewable record. Likewise, the Zexe protocol has not solved the traditional database limitations. Instead, public key/private key combinations will always leave documents vulnerable, as they are first public.

In a well architected provenance dApp, ZKP should construct a record that is unique, without relying on a third party, while maintaining an independent content identity for ongoing workflow and provenance. One of the biggest challenges to twinning digital records is how to decentralize the encryption of the file. Until dApps, this generally meant a centralized authority, assigning location/address, validating users, etc. The obvious solution for decentralization is to create a common cryptographic language, built on publicly available encryption methodologies. The problem with this, as compared to implementations described herein (i.e., the Peer dApp) is the lack of security inherent in this model.

The Zexe protocol creates a crypto-primitive with an agreed upon schematic—in particular, the "birth" and "death" of a record, capable of requiring a condition precedent. (e.g., if authorized, can open, can edit, plus obfuscation choices). This approach is excellent for transactional security but does not rise to the level of confidentiality when the blockchain holds a record of intrinsic value, such as a legal instrument (e.g., a divorce decree, a news clip provenance, etc.) with a record of editors and actions.

The Peer dApp crypto-primitive described herein is an independent vector created for security as well as decentralization. The local encryption, decryption, and control provided by the Peer dApp is a truly trustless solution because although the "how" of the record construction is known to all, the additional hardware vector makes it confidential. This content ID, instead of a time binary, is a combination of time, hardware and encryption. This is an anchor to replicate a digital twin, and control blocks through tokenization.

Thus, the Peer dApp adds another tool in the ZKP approach, i.e., tokenized content management expandable to both private and public blockchains through dApp or partnership. Until underlying databases are tokenized, and systems can reassemble, real-time, a digital twin of a legal instrument or source, interfacing with the blockchain will be limited. The Peer dApp achieves this level of flexibility because of unique architecture allowing it to be used as a Content Management System to map files on ledgers or blockchains, including to replicate content for read and/or write in virtual data rooms, to authenticate files, media, or workflow (provenance), to track and control media for web-wide Digital Rights Management (DRM), and/or to track and monetize user content on social media.

Thus, combining the unique architecture of Peer dApp with existing ZKP strategies for distributed ledger technologies results in a content management system for the blockchain that can be trusted by industry. Moreover, because Peer dApp has a decentralized architecture of its own, it can be used in lieu of blockchain, be developed as its own chain, be used as a dApp on public or private blockchains, and/or as a foundational database for dApps leveraging multi-algorithmic ZKPs.

As used herein, integrity means that every document should be traceable from the author's conception to the recipient's physical copy. Every video or photo should be authenticated from its fix in a tangible medium, through editing, to viewer identity. As used herein, confidentiality means that every file within a system should be accessible only by those authorized to view or edit content. However, current public/private key systems that leverage obfuscation continue to be hacked (see below).

In the past decade, application programming interfaces (APIs) have become the gold standard of interoperability. These APIs manage the vast amount of unstructured data required to run an application (or a cloud network) on the web. For example, when a user logs onto a popular web application, a user ID typically validates who the user is, what app features the user can access, and what content (documents and media) the user can see. While this structure is accessible, the existing database solutions are easily compromised and the content itself is easily hacked. This is also true with role-based solutions, including distributed and hybrid cloud networks, that leverage identity for access management.

Identity-dependent APIs rely on app makers, social media companies, and market analysts to maintain and respect data confidentiality. Role or Identity-based systems determine content access by identity only. For example, an author publishes content with a public key, and the reader accesses the content with their corresponding private key. When phrased this way, it is easy to see how the initial document (now "public") is protected only by obfuscation (i.e., a private key).

What is necessary is a secondary authentication method for content, not user identity. For example, a tokenization methodology for independent control and permissioning and a native, multi-blockchain interoperability protocol, created and instructed at the device level. To migrate these open practices directly to the blockchain would be premature and/or catastrophic, however. Like the "rush to the cloud" (which is common with dApps), the underlying work to secure and manipulate content has not been achieved in conventional methodology.

Blockchains promise to construct a unique record—usually of a transaction or event. Cryptographic blocks represent multiple properties, capacities, and functions. If the object does not have a direct trade value, such as in fungible tokens, the record (and even the entirety of the object) can be stored as a Non-Fungible Token (NFT) or Semi-Fungible Token (SFT). Decentralized apps today can construct this unique record, but in retrieving content they often leverage non-relational database structures. This means obfuscation and user-crawling is their main architectural modes for data storage and interoperability. As discussed in more detail below, screening customers from each other does not create confidentiality nor institutional security nor personal privacy from the service provider.

In general, conventional dApp solutions involving content (e.g., digital files or media) are very limited, due to underlying security concerns and/or provenance requirements, specific to their architecture. These solutions typically include simple certification. Certification is a limited use-case, though generally secure. It generally involves creating a certified copy—an authenticity token, such as an NFT—and either acting as an agent of transfer or authenticity, with no subsequent control. This is common when a technologist recognizes the limitations of transfer, or sale-based architecture, and only seeks to create a legal instrument (i.e., a tokenized copy for authentication). If further manipulation is contemplated, it is viewed as an off-chain functionality. Off-chain functionality of access or transfer destroys the provenance and authenticity promise of DLT. Likewise, by putting user data, permissions, media and metadata into one record, and using obfuscation to create a sense of user privacy, these dApps give a false sense of security. Thus, a problem with this approach, besides limited functionality and compromised security, is its ability to scale, as it does not account for a secure, DLT methodology for versioning or parent/child document control.

Concerning data-lakes as collaboration, a fundamental problem with most decentralized applications where content is accessed or shared is the overarching architecture and its lack of institutional and application level privacy. Data lakes are what occur when old apps update to the blockchain using a pre-configured "decentralized database." Files are centralized but functionality is decentralized via "nodes" which act in a similar manner as segregated servers. This is also true where the application is constructed for industry partnerships; once again, the conglomerate, acting as a centralizing or trusted host, contradicts the promise of user controlled, decentralized computing. These apps are decentralized only in so far as the lake of data is obfuscated from other participants in the consortia—either by the application or the system administrator in a node set up.

Nodes are the first serious attempt at creating confidentiality for documents and media on the blockchain. Although not hardware per se, like virtual machines (VMs) to cloud computing, nodes use software to create separate instantiations of a program, as if it were running its own server. An issue with this approach is that it is essentially post hoc in function. That is, the files are still in a shared pool, or at the very least, as a shared data lake. In nodes, the set-up is executed in a "trustless procedure." That is, it is a methodology requiring administrators so it is only as secure as the trust level in the other participants' information technology (IT) department.

To secure digital content, the industry recommends that hardware be used in encryption or delivery—preferably the former. However, development has mostly been focused on delivery through tunnels and configurations such as SGX. This is where the missed opportunity to create an architecture with independent content level security becomes evident. When the delivery instead of the construction is hardened, systems remain open to hacks, and miss the opportunity to create an independent security vector. Additionally, in security enclaves and traditional hardware (such as printers), the identity of the machine is tied to the public/private key architecture, meaning the identity of the machine inherits many of the user or role based "identity issues."

Zero Knowledge Proofs (ZKP), is a cryptographic methodology that has gained traction in recent years as a way to secure the identity of a transaction on the web. These ZKPs have been employed to overcome the limitations of data lakes, shared applications, and ecosystem-based Enterprise blockchain efforts, with a type of mathematical gamification applied to access. Most ZKPs use a mathematical model of probability to ensure the validity of the transaction—e.g., if a majority of nodes agree this person may sell and the other may buy, a user may execute a smart contract that becomes an object itself. Thus, ZKPs can also ensure all parties and objects are valid at the time of acceptance/transfer/etc. Where ZKP all short is in viewing that legal instrument, interacting with the media, or revoking document access without destroying originals with intrinsic value. To secure decentralized transacting, there must be a dApp that can create a decentralizing hash structure, with a content ID that likewise mirrors the uniqueness of a token.

With the Peer dApp methodology described herein, this independent identifier—a locally encrypted and decrypted parent token that incorporates content identity with the ability to mint controllable, revocable child tokens—makes it possible for content owners to share workflow, without compromising privacy, security, or control. For example, when the Peer dApp is deployed within a consortia architecture, with zero knowledge proof tokens and linked only to a crypto primitive that can only be accessed in session, shared files may become "ZKP token lakes," protected by order of operations, rather than "data lakes" to be ransomed or hacked.

As discussed in more detail below, the Peer dApp solves the problem of securing content, represented on, or instructed by, DLT. This methodology separates content from access permissions and utility in a way that makes it more compatible with ledger-based systems. With the Peer dApp methodology, decentralized encryption, decryption, and tokenization of function is possible, and every copy or rendering of content is traceable and controllable—whether it is accessed by the user-controller or those they permit to read or write. This facilitates digital rights management and file authentication, including, but not limited to workflow, watermarking, leak identification, and other models, including social tracking, Internet of Things (TOT), and cross-chain analytics.

As used herein, token refer to unique cryptographic blocks of data and instruction, for example ERC 721 or 1155 and Zero Knowledge Proof (ZKP) is defined as a cryptographic method to share information without exposing the information. A virtual data room (VDR) is defined as a viewing and editing room that comes together in user-session. A watermark is defined as a digital identifier unique to user and can be in file name or readable in content. A pHash is defined as a unique cryptographic value of media or file content that is image driven and authenticatable. A wrapper is defined as a method of interacting with content capacity such as a token that includes provenance and/or functionality.

An owner controller refers to the user who tokenizes content for interaction and decides storage, recipient(s), and token functions. This includes read/write, social and private sharing, revocation, duplication and cryptographic layering of gamification. Non-normalized databases refer to databases where every copy of a file is a unique replication. Native Tokenization refers to the concept that content, people, permissions are automatically and uniquely encrypted on the local level, whether via nodes, hardware, or devices. Tokens are ZKP Native—private, traceable, and for permission only (not path). Decentralized authentication refers to the concept that tokens are deciphered by nodes, devices, and/or gamification of an owner-controller choosing when a recipient presents the token in exchange for a file.

A wallet, as used herein, refers to a table of tokens, derived from one or more blockchains, regardless of functionality, and ascribed to a unique owner. The virtual data rooms indicate virtual location or safe rooms where content is replicated upon request, in user session that can be additionally secured, gamified, etc. Content control encompasses the concept that content can have multiple read/write authors and/or timed viewing; content can be tracked, shared, revoked, and deprecated in real-time. Traceable copies are tokens redeemed for files to create a record in the decentralized ledger, and if desired, recipient tokens. Along those lines, traceable recipients refer to authentication tokens that create recipient tokens (i.e., a derivative or child token subject to ongoing owner-controller control). A watermark refers to when a recipient token instructs additional digital identification of content. Perceptual hashing or pHashing refers to when a recipient token instructs for an additional visual hash of a recipient copy.

Most dApps are cloud-based solutions and are architected for interoperability. This means a file is represented as one record, and all permissions, metadata, and viewers are "attached." This type of architecture requires obfuscation for "confidentiality." In other words, the user experience or digital experience platform (DXP) will generally use APIs to limit what is shared, and to whom under a private/public key structure. Trust is the major concern but so is control.

However, to use the blockchain for media provenance, research workflow, file sharing, etc., the core database architecture must mirror blockchain principles, i.e., with independent, verifiable records uniquely tokenized for subsequent manipulation and control. The user-controller should be able to share or transfer content across databases, by and between multiple wallet IDs. This is how user ID can be "blockchain agnostic" while the database of tokens can reside on a public or proprietary ledger, and storage can remain independent. Conventional techniques lack this level individual content control and instead apply older, non-viable cloud-based methodologies to DLT which negate the promise of decentralization. The Peer dApp described herein leverages content-centric architecture and native tokenization, allowing the dApp to be used as both a distributed ledger of record (as a dApp, and/or in conjunction with a public or proprietary blockchain) and as a content controller on blockchain and blockchain-like systems.

Figure 14:
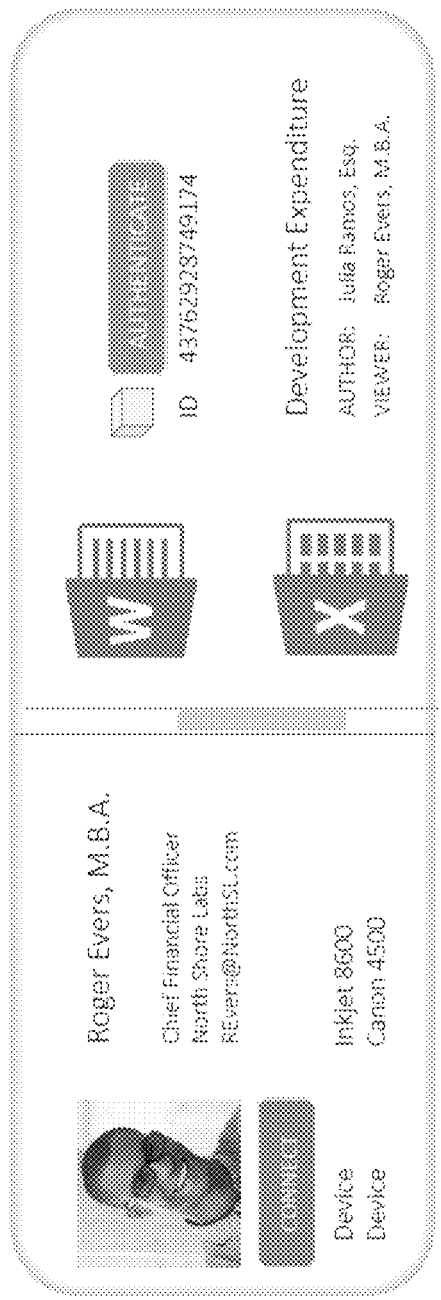
FIG. 14 illustrates an exemplary method of controlling a digital file.

From financial settlements to strategic analysis for research and development, there are serious repercussions for failing to track and control legally protected or strategically valuable information including, for example, external hacks and ransom demands, corporate espionage and financial loss, rogue employees and document leaks, embarrassing revelations and loss of credibility. In today's digital environment, legal departments need a comprehensive and proactive approach to document sharing and certification that can authenticate and revoke assets in real-time. The Peer dApp integrates risk management into every filed shared (paper or digital). Unlike other applications that may simply certify a file on the blockchain and then send it to any number of people, the Peer dApp uses a token exchange to create an immutable and traceable record. Not only does the Peer dApp provide stringent security, but it also allows the original author and/or company to maintain control over a file long after it is sent (FIG. 14).

For example, the Peer dApp tracks paper or digital copies of files. Each copy is unique and can be cryptographically validated or repudiated. The Peer dApp certifies documents and media and sends and received unique files certified as original on the blockchain. The Peer dApp protects original documents and media with encryption that automatically protects files with a crypto-primitive. The Peer dApp allows access to be controlled using granular level content control maintained by the author for real-time and ongoing control.

Figure 15:
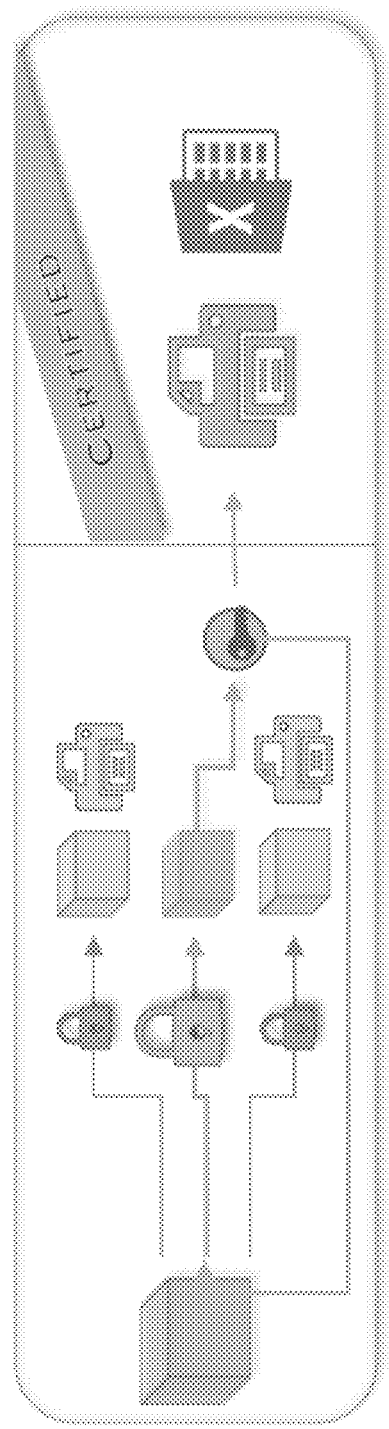
FIG. 15 illustrates an exemplary dataflow.

The Peer dApp is a decentralized file sharing system that creates a uniquely encrypted digital file or watermarked print copy for each file delivered, which simplifies compliance. The Peer dApp provides a simple user interface and experience that allows each user to upload, encrypt, and share tokens while maintaining control over digital copies. For example, the Peer dApp provides organizational-level control, automatic decentralized encryption, and allows a user to anchor a private blockchain to a public blockchain to provide immutable proofs and timestamps (FIG. 15). The Peer dApp works in parallel with existing notary systems, providing a notary the keys and maintaining compatibility with existing processes.

Thus, the Peer dApp provides a file exchange that operationalizes and authenticates using a blockchain. Using, for example, peer-to-peer sharing on a blockchain, the Peer dApp provides a method of exchange that is also the method of record. Beginning at a database, each file has its own unique identity, independent of users, that leverages tokenization to control access in real-time.

Figure 16:
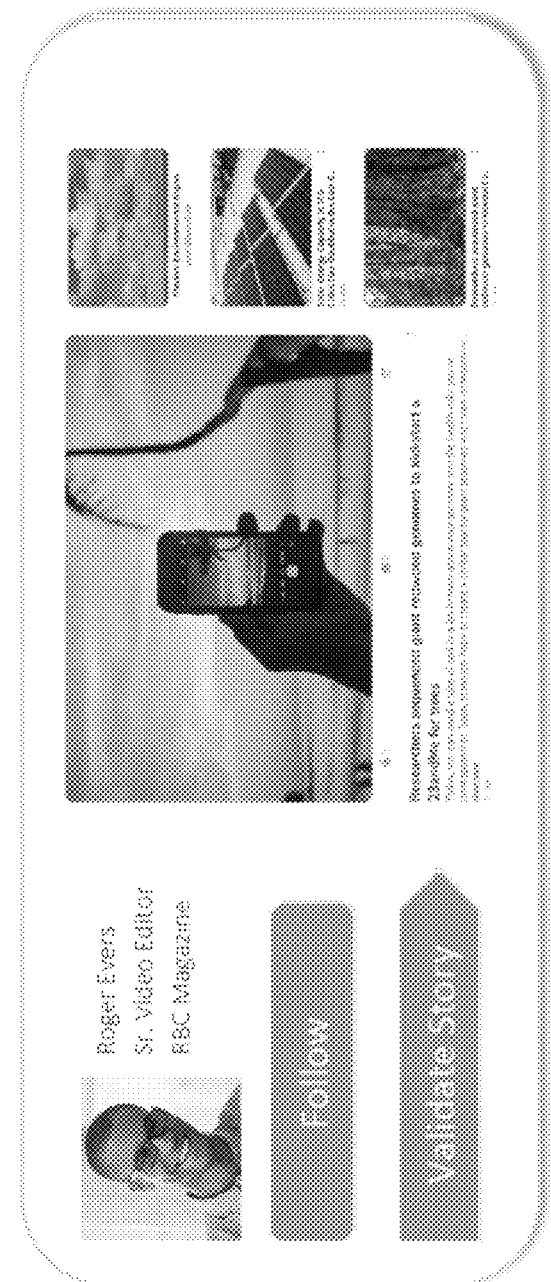
FIG. 16 illustrates an exemplary certification and validation of articles.

In some implementations, as shown in FIG. 16, the Peer dApp provides a decentralized application for provenance that certifies and validates an entire production arc, including all content types and multiple authors. This balances the public's "need to know" with proprietary information. The Peer dApp may provide a public platform with public content authentication and social sharing that is file neutral supporting multiple file and media types (e.g., camera, phones, files, etc.). The Peer dApp supports team projects such that a story can have multiple read/write contributors and certified stores may include files and media that are registered, tracked, and validated via a blockchain (FIG. 17).

Figure 18:
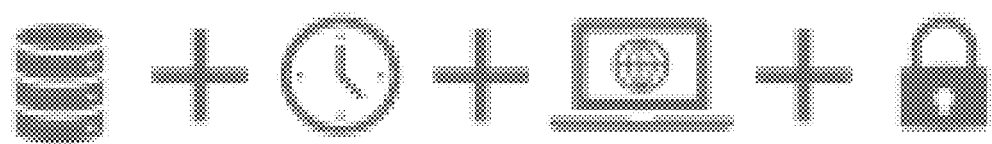
FIG. 18 illustrates hashes for a crypto-primitive.

Referring now to FIG. 18, a system includes a Peer dApp that provides native tokenization as a natural expression of a crypto-primitive. A Content ID may be assigned as a unique, dynamic key upon upload or mapping, directly on user's hardware, or on a software proscribed node. This content ID is not user dependent and mirrors the uniqueness requirement of DLT. In some embodiments, the content ID is assigned to a file when uploaded into the system. In some embodiments, the content ID assigned to a file when mapped into the system. In some embodiments, the content may be reviewed by machine learning or AI systems at this stage. In some examples, the system generates a unique hash (h) for each element which is subsequently hashed and a product key is centralized. As shown in FIG. 18, the unique hash may include a hash of an ecosystem server system variable plus a hash of a current time plus a hash of a server MAC address plus a Peerdash product key.

The content ID may be wrapped with a token by each user, organization, node or device, using a unique blockchain methodology as an ecosystem-wide common data scheme for content level interoperability and security. When uploading through the Peer dApp, the local hardware, device, or node may assign the content ID and encrypt the path before any user or storage is associated with the file. This may use the same unique hashing scheme previously discussed (i.e., system server variable+current time+server MAC address+product key). In some embodiments, this token is assigned and/or stored on the uploading user's hardware. In some embodiments, this token is assigned and/or stored on a software table within a shard or node paradigm. In some embodiments, this token is assigned and/or stored as a hash on a public or proprietary blockchain for multi-level, multi-chain use cases.

By segregating identity from content, the content can be tokenized. This permission token acts as a wrapper for content security and user-owner control and allows interfacing as a smart contract with wallets and dApps. This allows for access permissioning and controlled sharing by and between wallets, digital twining for public or private blockchains and other dApps, and/or encoding of instructions for interoperability. Once content is tokenized, the content ID can be updated if the environment requires it (e.g., the InterPlanetary File System (IPFS) or a private blockchain). This can replace or augment the hash generated locally by the uploader. Provenance, however, remains embedded in the token; versus ownership, which only changes if there has been a valid transfer recorded on the validating blockchain.

Figure 19A:
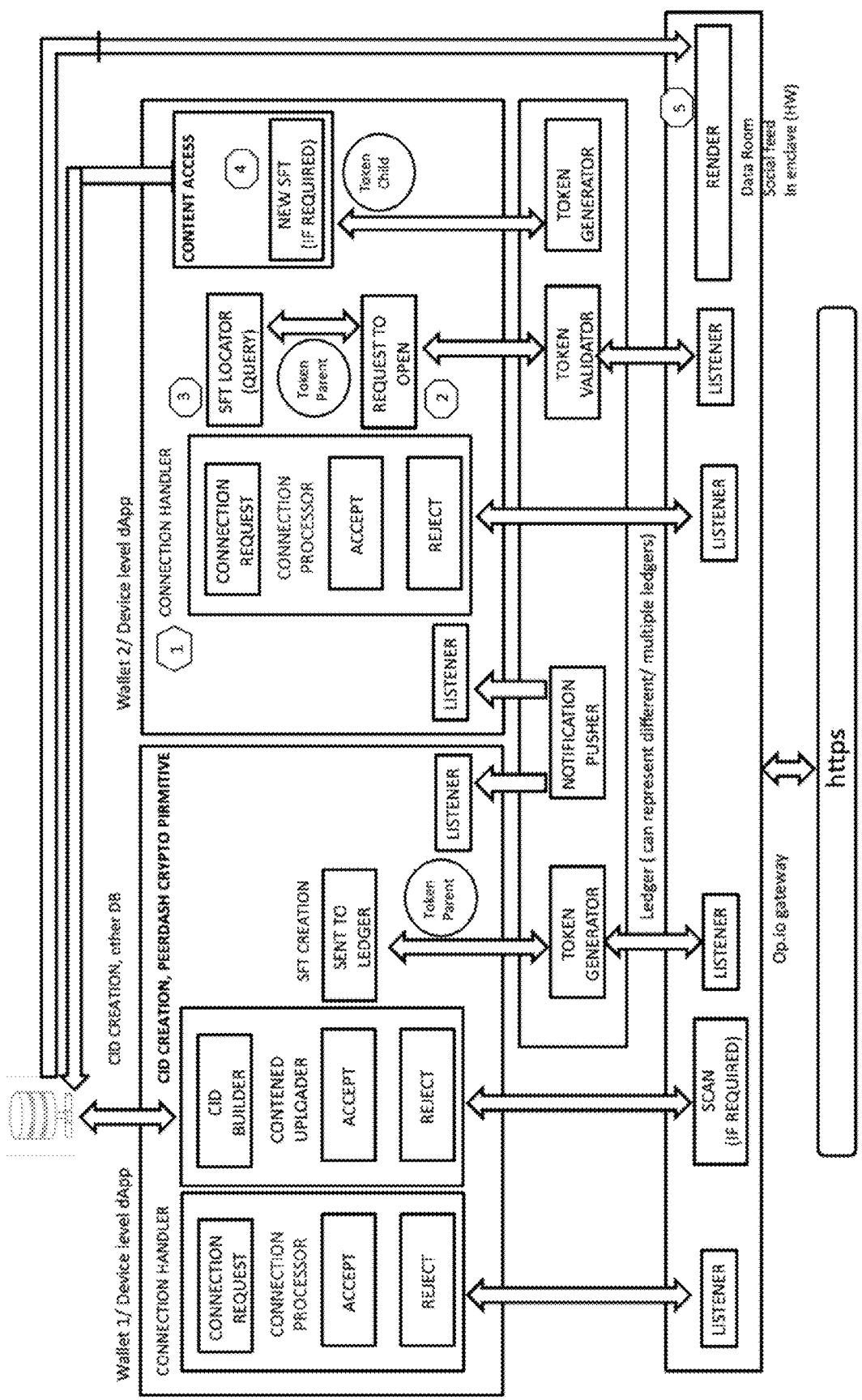
FIG. 19A illustrates a block diagram for content identification tokenization.
Figure 19B:
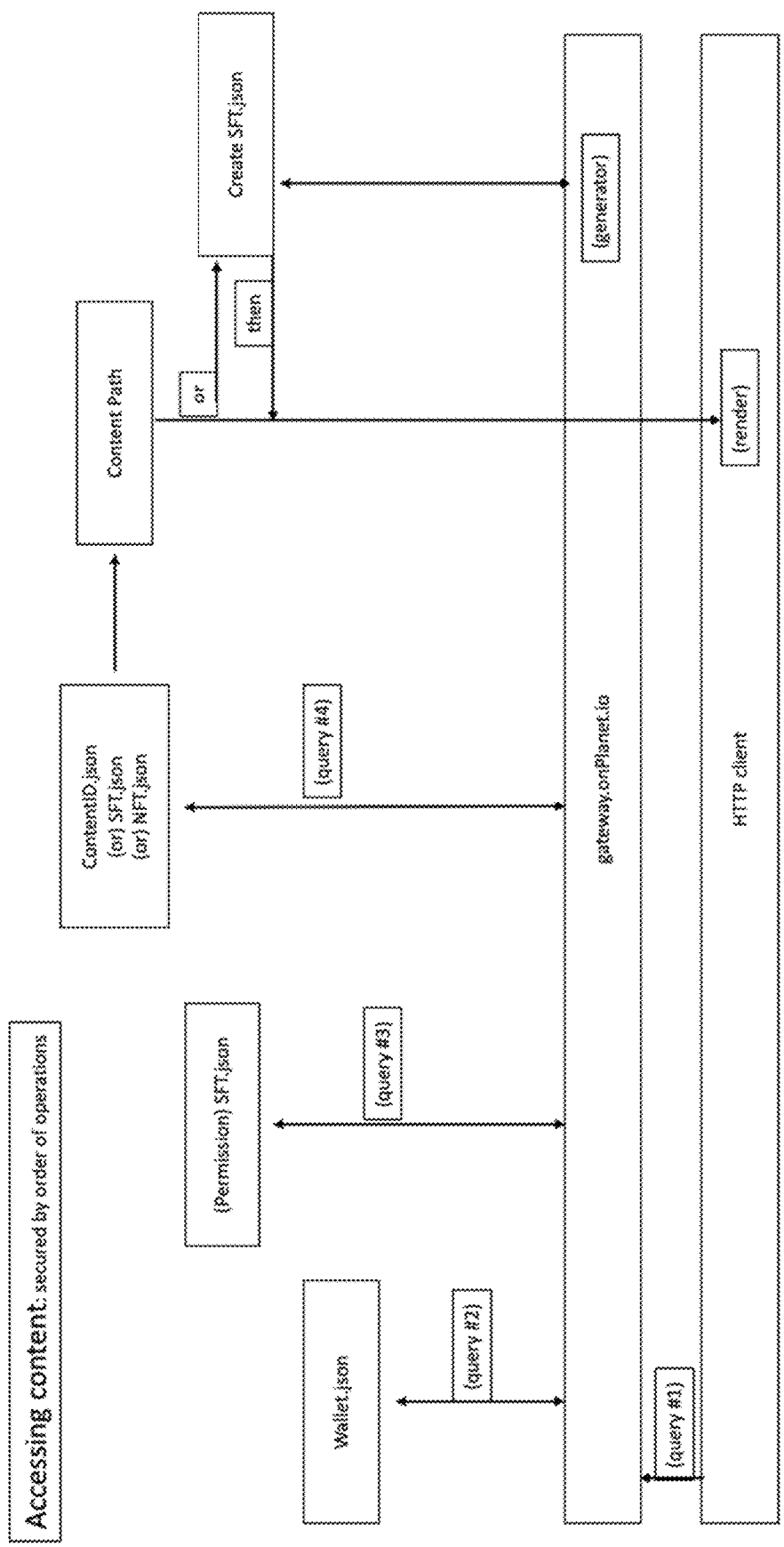
FIG. 19B illustrates an exemplary multi-ledger compiler configuration.

Referring now to FIGS. 19A and 19B, in some implementations, content is assigned permanent or temporary storage by the user. In some embodiments, the user chooses to store the content directly on their device. In some embodiments, the user assigns the content to public or private storage. In some embodiments the storage assigns the content a new ID, prior to the tokenization, such as with the Inter-Planetary File System (IPFS). Peer dApp tokens may be promulgated at the local level and come together in user session through a series of steps (FIG. 19A). This tokenized access process is an order of operations that decentralizes content identity without ever revealing the local encryption. FIG. 19A illustrated content ID tokenization at a granular level with real-time content control in decentralized applications. In this way, the Peer dApp methodology works as a compiler, leveraging permission tokens for functionality—even across multiple, proprietary, or public ledgers.

Content access may be assigned by the uploader user (now a "controller user") via a token with the capacity to negotiate functions that can be changed in real time (FIGS. 19A and 15B). In some embodiments, the token will be used for access and permissioning control. In some embodiments, the token can transfer ownership. In some embodiments, the token location can be transferred—either in transfer of ownership or under owner discretion. FIG. 19B illustrates an exemplary multi-ledger compiler configuration. The tokenized content, in some examples, is decrypted only by the intended user (i.e., at the hardware level and/or software level) via blockchain wallets even when the system is deployed across nodes. In some embodiments, the ledger contains a token for each recipient. In some embodiments, the dApp creates a new token for each recipient. In some embodiments, the ledger contains a token for public permission.

Figure 20A:
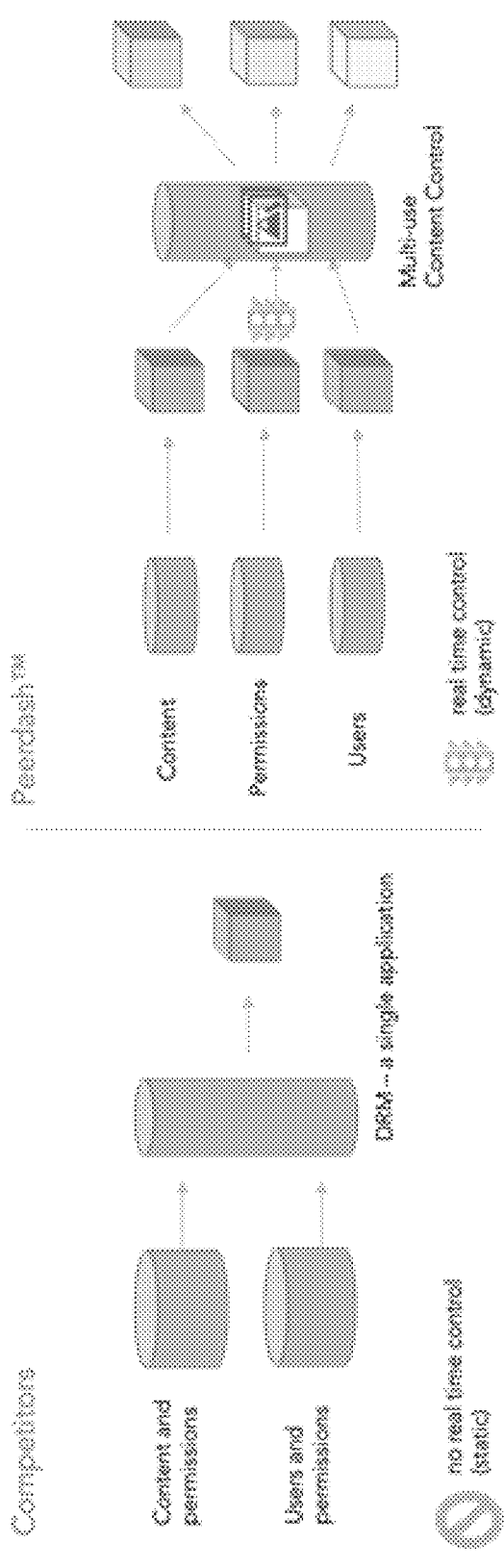
FIG. 20A illustrates deprecating and revoking tokens and blocks.
Figure 20B:
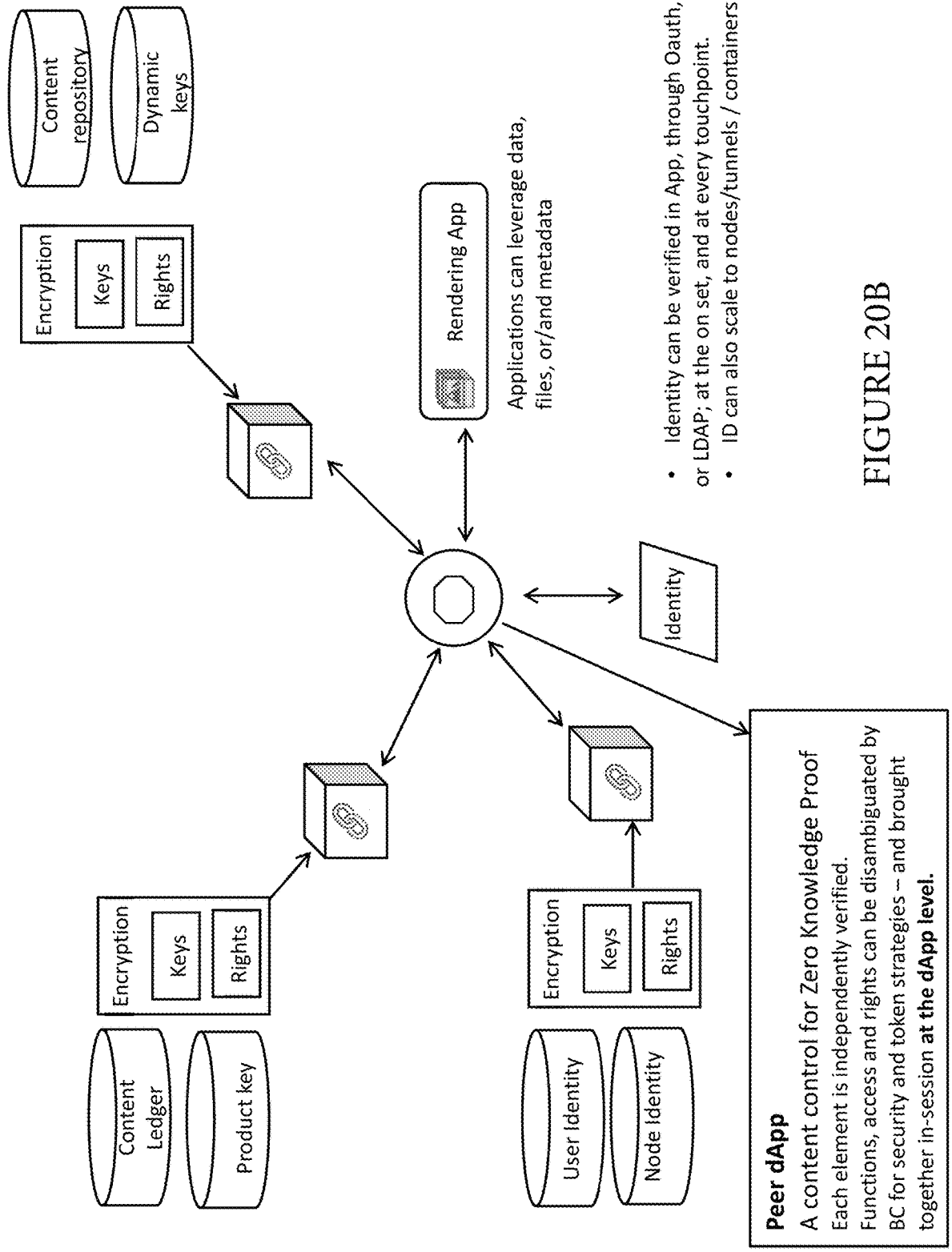
FIG. 20B illustrates a zero knowledge proof in combination with an external database.

Referring now to FIGS. 20A and 20B, token and block strategies may include digital rights management (DRM) with derivative securities financing transactions (SFTs) where a record can be deprecated or revoked (FIG. 20A). Zero knowledge proof (ZKP) may be used in combination with external databases, user wallets, or node-based identifies for ZKP compatible content security and rendering (FIG. 20B). The Peer dApp methodology may work with both hardware and nodes in more secure manner than conventional techniques because it addresses confidentiality with its methodology for constructing a unique cryptographic primitive primed for content and/or permission tokenization. As a compiler, the system tokenizes functionality, recognizing multi-chain identities and content tokens—native or otherwise.

The system may provide content secured as a token, functioning as a wrapper. In this regard, only the controller user is included in the parent token and derivative tokens are unique duplicates for multiple use cases (FIGS. 19A-19B). In some embodiments, the content ID and wallet identity of the controller-user is stored on a blockchain ledger, whether in a public or proprietary blockchain or within a shard or node paradigm. In some embodiments, the content ID and wallet identity of both the controller-user and recipient are stored, whether in a public or proprietary blockchain or within a shard or node paradigm. In some embodiments, the content ID and wallet identity of both controller-user and recipient are stored in an authentication server. In some embodiments, the content ID and wallet identity of controller-user and recipient are stored in a dApp server.

The Peer dApp and system may create greater product inter-operability by trifurcating content, permissions, and users (as wallet IDs) that come together dynamically through tokenized direction, whether for viewing, downloading, printing, editing, monetizing, or authenticating. In some embodiments, the token is authenticated and matched to a ledger entry prior to rendering, via a software table stored within decentralized, owner-controller directed hardware. In some embodiments, the token is authenticated and matched to a ledger entry prior to rendering, via a software table within a dApp server under owner-controller or node control. In some embodiments, the token is authenticated and matched to a ledger entry prior to rendering, via a software table within a shared server under owner-controller or node control.

In some implementations, the system provides real-time permissions that may be analyzed, recorded or revoked by the controller-user. In some embodiments, token activity is tracked by the controller user for real time tracking and deprecation of the asset path. In some embodiments, token activity is tracked by the controller user for real time tracking and deprecation as an asset for hardware. In some embodiments, token activity is tracked by the controller user for real time tracking and deprecation of a physical copy Token revocation is achieved by mapping access permissions as a separate ledger entry (token) and creating transformative blocks upon decryption. The benefit of this is relevant in secure negotiations to digital rights management. In some embodiments, if a file has not been accessed, the new authenticated token never existed. In some embodiments, if a token is revoked or the block no longer valid, the ledger entry no longer matches which results in a "no-known file" return.

In some examples, the Peer dApp allows each node or hardware under control of the owner-controller (or institution) to create their own content ID. This is achieved by using several independent encryption factors, including hardware, time, and the hardening the security with aggregated hashes. This content ID is subsequently wrapped with a token. The content ID may also be tokenized as a content token in multi-chain or multi-layered solutions. This trifurcation of wallet identity, content ID (or content token) and permission token facilitates virtual data rooms, watermarking, and leak identification. It integrates hardware systems without software vulnerabilities and allows for cryptographic layering of decentralized content referenced on the blockchain.

Virtual data rooms are a means to view content within secure cyberspace without exposing file paths or requiring secure set ups that are not truly trustless. With content ID, the Peer dApp replicates the file into the meeting space, creating a new record. In some embodiments, the token remains an authentication and cannot be transferred. In some embodiments, the token is wrapped in another token that can be transferred. In some embodiments, the token is wrapped in another token that cannot be transferred. In some embodiments, the permission token is wrapped in another token, creating a record of that session. In some embodiments, the token remains the owner-controllers and holds the record of that session.

In some implementations, the Peer dApp tokens can direct the dApp to create a unique watermark using methodologies detectable through pHash. It is this application of the technology that allows content to be identified upon advertent and inadvertent leaks in both the virtual and physical world. In some embodiments, the tokens create a secondary token that can be cryptographically tagged at the individual user level. In some embodiments, theses tokens can be directed to embed physical attributes on individual copies upon printing. In some embodiments, the physical attributes of the file can be cryptographically altered as to be detectable in the real world by app certified hardware (such as printers or cell phones). In some embodiments the IP firewall quarantines and blocks marked documents from passing out of the network until checked and authorized.

The Peer dApp may operate as a traffic cop or database compiler by, for example, querying tokens and directly from the user device, while authenticated permissions, through tokenized wrappers on a public or proprietary blockchain direct file rendering. The Peer dApp permission tokens include the content; however, the file is not dependent upon that location for storage and can be manipulated real-time by the content owner-controller and transferred to other servers, hardware, or devices. Currently, cloud-based server arrays hold and serve content to mostly create a master slave duplication of content and application. Here, security relies on obfuscation in the user experience (UX). The peer dApp separates this experience and creates new security possibilities. In some embodiments, the content can be transferred for cloud strategies or data relocation. In some embodiments, the content can be removed and/or written over. In some embodiments, the content can be routed by function. In some embodiments, the content can be relocated for legal requirements. In some embodiments, the content can be otherwise removed or directed by the user in real-time.

The peer dApp system allows location to remain under the control of the owner-controller. That is, location can be fixed or shared (as, for example, an SFT or NFT), public (as in the IPFS), or private (as in a proprietary blockchain). In some embodiments, the content is shared by its owner-controller (such as social media or direct sharing). In some embodiments, the content is moved by the institution (such as in enterprise computing). In some embodiments, the content is duplicated by function (as in new block promulgation). In some embodiments, the content is moved in response to a series of rules (such as top secret labeling or software constraints).

By forcing an order of operations on recipient requests with real-time interruption capability, the Peer dApp creates a secure network that can be used for server arrays, nodes, and container technology. In some embodiments, tokens can be used to create blockchain interoperability by and between server arrays, regardless of type or location. In some embodiments, tokens can be used to create blockchain interoperability by and between containers, regardless of hosting type. In some embodiments, tokens can be used to create blockchain interoperability by and between nodes, where content can be stored in private or public clouds.

Figure 21:
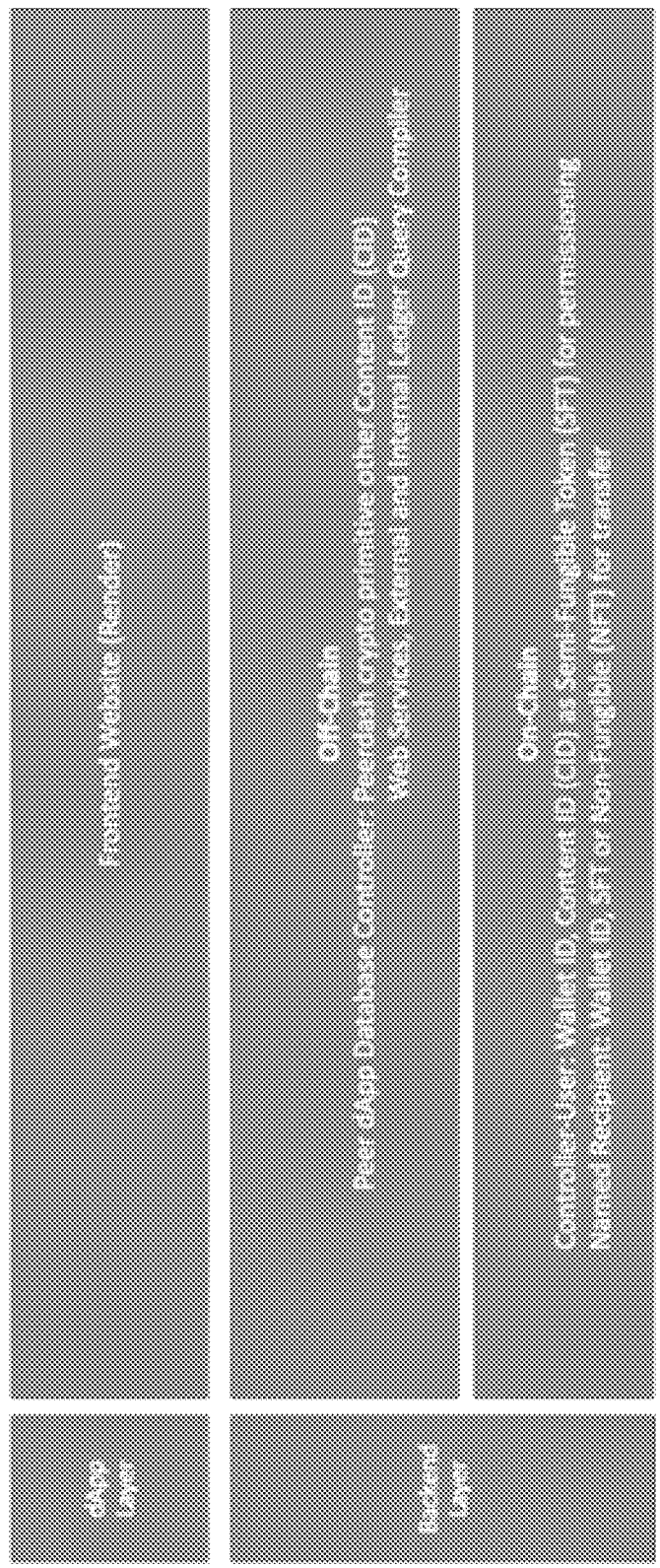
FIG. 21 illustrates an exemplary content wrapping.
Figure 22:
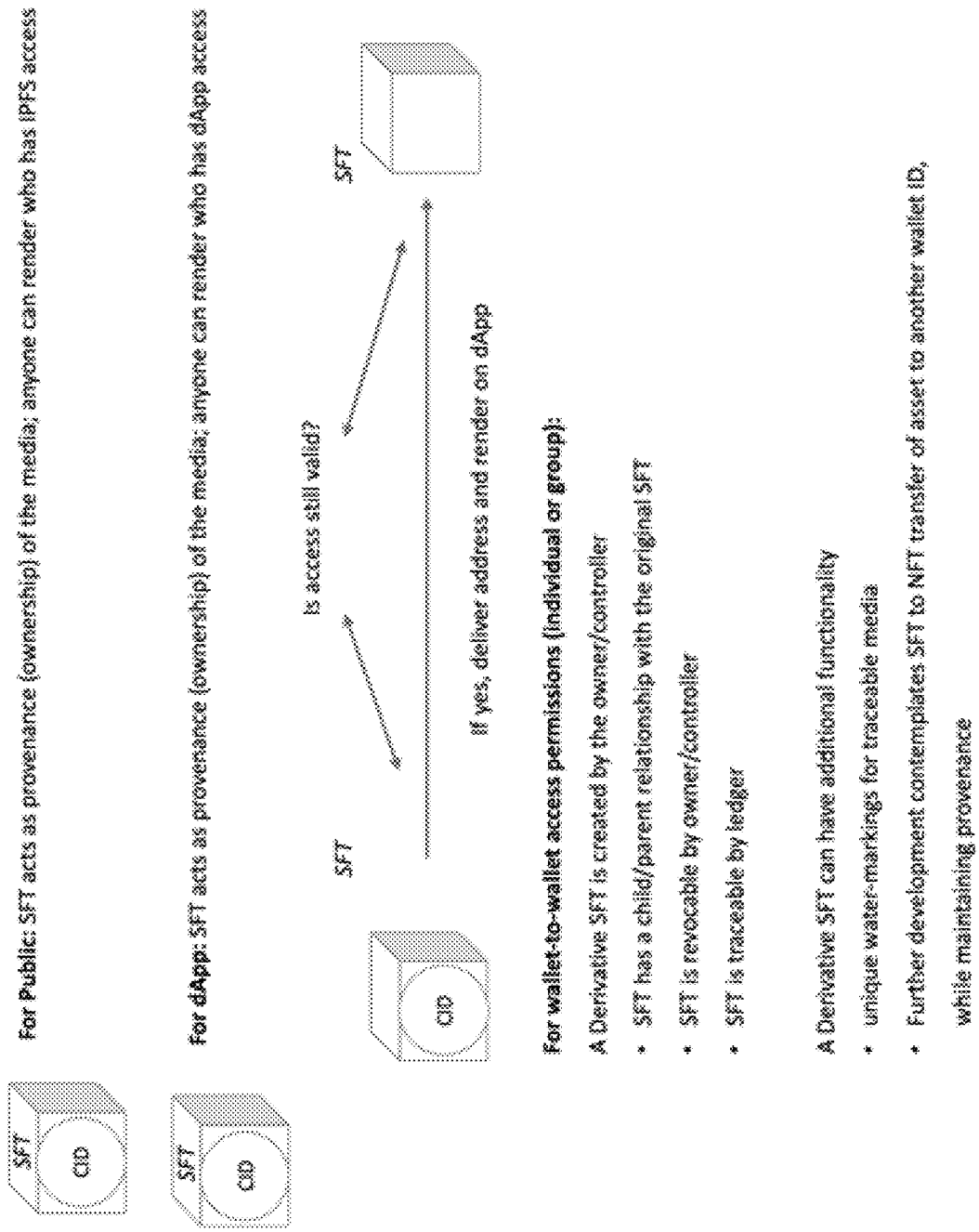
FIG. 22 illustrates an exemplary content wrapping of content identities.

Referring now to FIGS. 21 and 22, zero Knowledge Proof solutions have been proposed to cure the confidentiality issue inherent in data-lakes. However, this becomes an obfuscation technique where the file path is exposed (public, or between participants) and gamification is used to prove access. For database integrity and confidentiality, the underlying content must be secured with a private key—whether it is simply being accessed by a dApp or gamified with ZKP. With the Peer dApp private content ID that is independent of user identity, both user-controller and permitted viewers use tokenization to access files which creates a real-time, secure methodology for independent permissioning. This hardens the system against insider attacks and fulfills the trust requirements of blockchain transactional security, as the ledger of the aggregate hashes is a ZKP compatible file manager that can be queried, replicated, or stored.

Tokens are the means of exchange on a blockchain system and therefore they navigate the application. This independent content control opens the doors to multiple use cases. In some embodiments, content rendering can be layered with additional gamification (ZKP). In some embodiments, content rendering can be layered with additional bio-security. In some embodiments, content rendering can be layered with additional hardware security. In some embodiments, content rendering can be layered with additional node security. In some embodiments, content rendering can be layered with additional user identity or role-based security. In some embodiments, content rendering can be layered with additional container-based security. In some embodiments, content rendering can be layered with additional real-time, human permissioning (e.g., call and answer).

Thus, the Peer dApp includes a computer method that can encompass both hardware and software to direct authentication, sharing and retrieval of digital assets through Distributed Ledger Technologies (DLT). The dApp provides for real-time control, validation and revocation of files on distributed servers by and between Public and proprietary blockchains and/or other decentralized platforms. In some implementations, it includes a computer method to track and/or control files referenced in ledgers or blockchain—regardless of whether they are shared internally, socially, or in the physical world.

Other embodiments are within the scope of the following claims.

The invention claimed is:

1. A computer-implemented method when executed by data processing hardware causes the data processing hardware to perform operations comprising:
receiving, from a user, content for distribution via a decentralized application;
generating, by a user device associated with the user, a content identity (ID) associated with the content, the content ID comprising a unique key;
wrapping, by the user device, the content and the content ID with a first token generated by a distributed ledger;
assigning, by the user device, using a second token generated by the distributed ledger, a recipient access to the content; and
decrypting, by the recipient, the content using at least one of the first token or the second token.

2. The method of claim 1, wherein the first token is stored at the user device or as a hash on a blockchain.

3. The method of claim 1, wherein generating the content ID comprises using the InterPlanetary File System.

4. The method of claim 1, wherein the content is stored on the user device.

5. The method of claim 1, wherein the content is stored remote from the user device.

6. The method of claim 1, wherein the recipient decrypts the content via a blockchain wallet.

7. The method of claim 1, wherein the operations further comprise assigning, by the user device, using a third token generated by the distributed ledger, a second recipient access to the content.

8. The method of claim 1, wherein the user is associated with a wallet identity, and wherein the wallet identity is stored, by the distributed ledger, on a blockchain.

9. The method of claim 1, wherein the operations further comprise revoking, by the user device, the assigned access to the recipient based on revocation of the second token.

10. The method of claim 1, wherein the operations further comprise revoking, by the user device, the assigned access to the recipient based on revocation of the first token.

11. The method of claim 1, wherein the operations further comprise viewing, by the recipient, the content via a virtual data room.

12. The method of claim 1, wherein the operations further comprise generating a watermark for the content.

13. The method of claim 12, wherein the operations further comprise verifying the watermark using perceptual hashing.

14. The method of claim 1, wherein the first token comprises a non-fungible token.

15. The method of claim 1, wherein decrypting, by the recipient, the content comprises authenticating the second token via the distributed ledger.

16. The method of claim 15, wherein authenticating the second token comprises accessing a software table.

17. The method of claim 1, wherein decrypting, by the recipient, the content comprises authenticating, by the distributed ledger, the recipient.

18. The method of claim 17, wherein authentication the recipient comprises authenticating gamification, bio-security, hardware security, node security, role-based security, container-based security, or human permissioning.

19. The method of claim 18, wherein the gamification comprises a zero knowledge proof.

20. The method of claim 1, wherein the operations further comprise transferring ownership of the first token from the user to a second user.

* * * * *